(12) United States Patent
McMaster

(10) Patent No.: US 8,938,967 B2
(45) Date of Patent: Jan. 27, 2015

(54) HYBRID WIND TURBINE

(76) Inventor: Thomas McMaster, Bellingham, WA (US)

( * ) Notice: Subject to any disclaimer, the term of this patent is extended or adjusted under 35 U.S.C. 154(b) by 939 days.

(21) Appl. No.: 13/031,125

(22) Filed: Feb. 18, 2011

(65) Prior Publication Data

US 2011/0187119 A1    Aug. 4, 2011

Related U.S. Application Data

(63) Continuation-in-part of application No. 12/616,029, filed on Nov. 10, 2009, now abandoned, which is a continuation-in-part of application No. 12/022,958, filed on Jan. 30, 2008, now Pat. No. 7,615,884.

(60) Provisional application No. 60/898,619, filed on Jan. 30, 2007, provisional application No. 61/306,483, filed on Feb. 20, 2010.

(51) Int. Cl.
- *F01B 21/04* (2006.01)
- *F01K 23/00* (2006.01)
- *F03G 6/00* (2006.01)
- *F03D 9/00* (2006.01)
- *H02P 9/04* (2006.01)
- *F03D 9/02* (2006.01)

(52) U.S. Cl.
CPC *F03D 9/02* (2013.01); *Y02E 10/726* (2013.01)
USPC ............. 60/698; 60/641.8; 290/44; 290/55

(58) Field of Classification Search
USPC ............. 60/641.8–641.15; 290/44, 55
See application file for complete search history.

(56) References Cited

U.S. PATENT DOCUMENTS

| | | | |
|---|---|---|---|
| 2,315,424 A | 3/1943 | Hill et al. | |
| 3,484,617 A * | 12/1969 | Winsel | 290/44 |
| 4,204,126 A | 5/1980 | Diggs | |
| 5,740,677 A | 4/1998 | Vestesen | |
| 6,127,739 A | 10/2000 | Appa | |
| 6,278,197 B1 | 8/2001 | Appa | |
| 6,492,743 B1 | 12/2002 | Appa | |
| 7,233,079 B1 * | 6/2007 | Cooper | 290/44 |
| 7,397,142 B1 * | 7/2008 | Cooper | 290/44 |
| 7,471,010 B1 * | 12/2008 | Fingersh | 290/55 |
| 7,745,948 B2 * | 6/2010 | Kerber | 290/44 |
| 2005/0225091 A1 | 10/2005 | Enis et al. | |
| 2007/0079611 A1 * | 4/2007 | Doland | 60/495 |
| 2008/0258473 A1 | 10/2008 | McMaster | |
| 2008/0317583 A1 | 12/2008 | Grabau | |
| 2009/0134624 A1 * | 5/2009 | Kerber | 290/44 |

* cited by examiner

*Primary Examiner* — Christopher Jetton
(74) *Attorney, Agent, or Firm* — Michael R. Schacht; Schacht Law Office, Inc.

(57) ABSTRACT

An electrical power generation system comprising a tower, a nacelle supported by the tower, a wind turbine system supported on the nacelle, a fuel cell system, a battery system, a hybrid solar/fuel cell system; and a fuel line extending through at least a portion of the tower and to the fuel cell system.

13 Claims, 22 Drawing Sheets

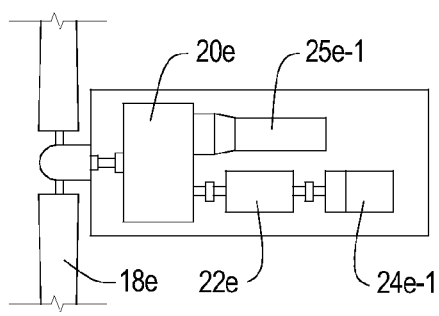
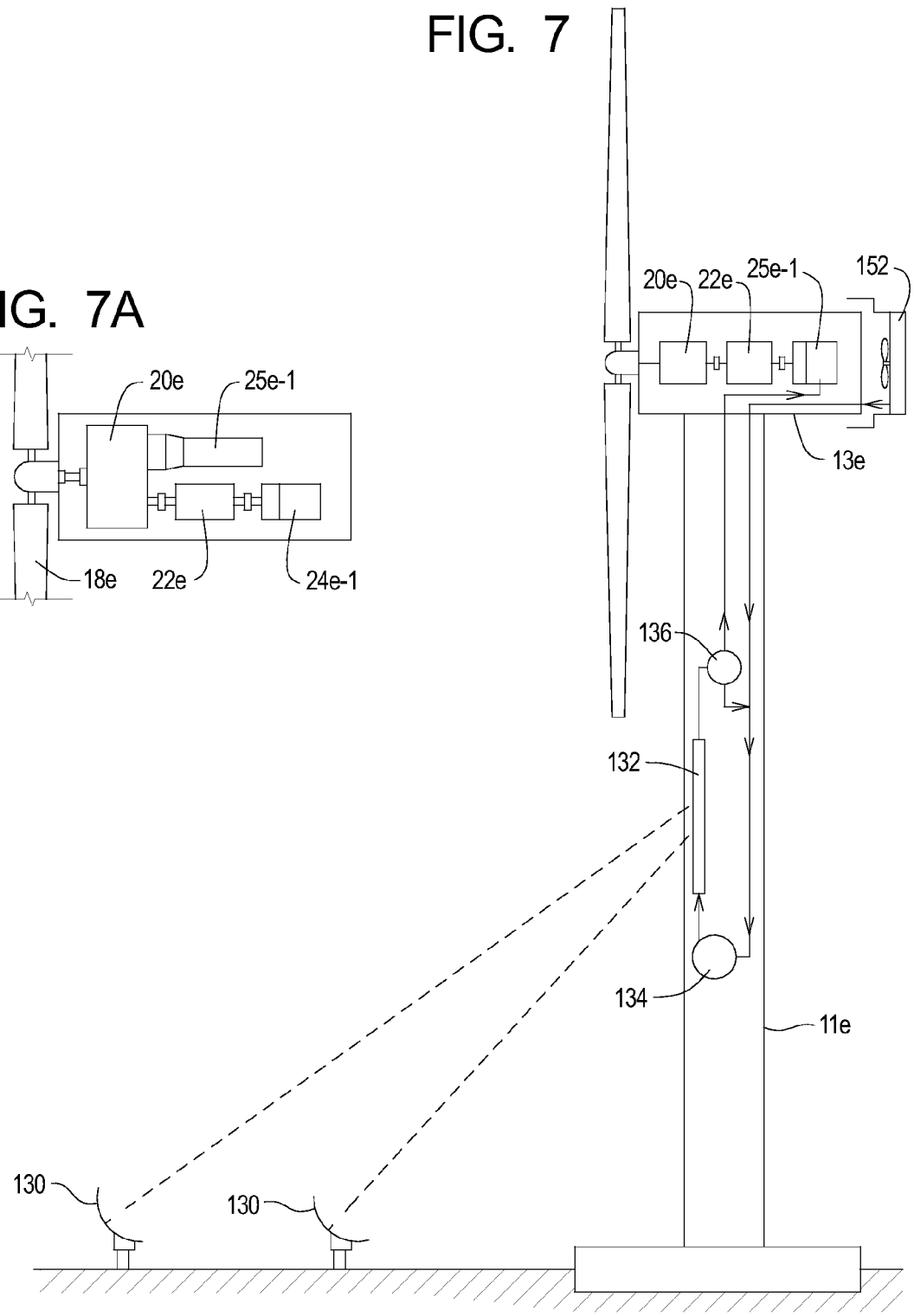

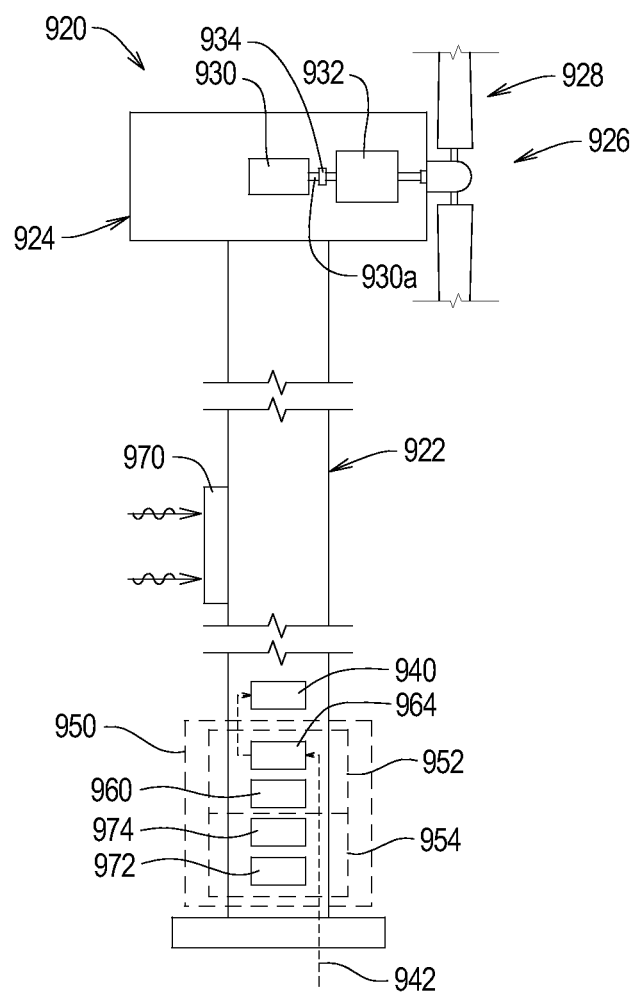

HYBRID WIND TURBINE

RELATED APPLICATIONS

This Application, U.S. patent application Ser. No. 13/031,125 filed Feb. 18, 2011, is a continuation-in-part of U.S. patent application Ser. No. 12/616,029, filed Nov. 10, 2009 now abandoned.

U.S. patent application Ser. No. 12/616,029 is a continuation in-part of U.S. patent application Ser. No. 12/022,958 filed Jan. 30, 2008, now U.S. Pat. No. 7,615,884, issued Nov. 10, 2009.

U.S. patent application Ser. No. 12/022,958 claims priority of U.S. Provisional Patent Application Ser. No. 60/898,619 filed Jan. 30, 2007.

This application Ser. No. 13/031,125 also claims priority of U.S. Provisional Patent Application Ser. No. 61/306,483, filed Feb. 20, 2010.

The contents of all related applications listed above are incorporated herein by reference.

TECHNICAL FIELD

The present invention relates in general to wind turbine technology, and more particularly to a system combining the apparatus and method of the wind turbine with other energy sources.

BACKGROUND

While wind turbine power has many advantages as an additional and/or alternative source of energy, it does have the drawback that there are time intervals where it is not able to produce any power at all, or only a small amount of power. Thus, there have been various approaches to combine the wind power source with other independent power sources to be able to produce power more reliably, in the form of "firm power".

A search of the patent literature has disclosed patents related to solving these problems, and these are summarized in the following text.

U.S. Pat. No. 4,204,126 (Diggs) discloses a "Guided Flow Wind Power Machine With Tubular Fans", which, when powered by the wind, can generate electricity. Also, when there is enough wind power it has the capability of also lifting "massive weights" hydraulically. Then when the wind has subsided, the weights can be permitted to be drop downwardly to supply energy to drive a generator. FIGS. 4 and 5 show the weights 114 through 120 arranged in quadrants.

U.S. Pat. No. 5,740,677 (Vestesen) shows a system which is adapted for use at a location where there is a need for electricity and also fresh water. However, this residential community is also near a source of salt water. There is a wind diesel plant which supplies electricity for various uses and also operates a distillation unit to supply the fresh water. The wind/diesel plant comprises at least an internal combustion engine, a wind turbine, a distillation unit, a first closed fluid circuit containing heating and cooling devices, and a second open fluid circuit.

U.S. Pat. No. 6,127,739 (Appa) issued Oct. 3, 2000, and is the first of three patents which have the same inventor. In this patent, there is a forward front rotor 12 having blades that would cause rotation in one direction, then there is a rear rotor 21 (called a "leeward rotor 21") positioned behind the front rotor 12 and rotating in the opposite direction. This patent states that the various items added to this apparatus would produce a substantially higher "value of energy efficiency factor".

U.S. Pat. No. 6,278,197 (Appa) is the second patent to the inventor and it discloses a wind turbine where there is a forward set of turbine blades which rotate in one direction, and a second set of turbine blades which are in the wake of the first set and which rotate in the opposite direction. The reason given for this is that there is still energy in the air that passes through the first set of turbine blades, and this is utilized in the second set of turbine blades.

U.S. Pat. No. 6,492,743 B1 (Appa) is the third (and more recent) patent to Mr. Appa, and this also shows a basic configuration of wind turbine where there are forward and rear sets of blades. There is a heat exchanger having a centrifugal fan to circulate ambient air to cool an alternator in the apparatus, and the hot air is directed to a combustion chamber by means of an air duct in the blades. Natural gas or liquid is also conveyed to the rotating frame. When wind speed is low, fuel will be injected into the combustion chamber and burned with a large mass of air. The hot gasses expand in an exit nozzle to provide thrust to assist wind power.

SUMMARY

The present invention may be embodied as a thermal energy system comprising a primary thermal energy system, a solar thermal energy system, a burner, and a heat recovery system. The solar thermal energy system comprises a pipe for absorbing heat from solar rays. The burner is arranged such that the pipe of the solar thermal energy system is capable of absorbing heat from the burner. The heat recovery system uses thermal energy from at least one of the primary and solar thermal energy sources.

The present invention may also be embodied as a method comprising the following steps. A primary thermal energy system is provided. A solar thermal energy system comprising a pipe for absorbing heat from solar rays is provided. A burner is arranged such that, when the burner generate heats, the pipe of the solar energy system absorbs heat generated by the burner. Thermal energy from at least one of the primary and solar thermal energy sources is recovered.

The present invention may also be embodied as a hybrid wind turbine comprising blades supported on a hub, a generator, an engine, a solar thermal energy system, and a heat recovery system. The generator is operatively connected to the hub such that rotation of the blades operates the generator. The engine is operatively connected to the generator such that operation of the motor operates the generator. The heat recovery system uses exhaust heat from the generator and heat collected by the solar thermal energy system.

BRIEF DESCRIPTION OF THE DRAWINGS

FIGS. 7 and 7A are views that show a basic wind turbine system which also utilizes solar energy to add energy to the system;

FIG. 21 is an elevation view of an example hybrid wind turbine system that employs a tower mounted hybrid fuel cell as an auxiliary power source and also including a tower mounted solar absorber system;

DETAILED DESCRIPTION

Figure 1:
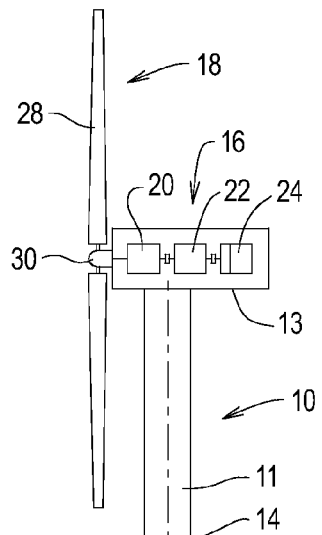
FIG. 1 is an elevation view of a hybrid wind turbine system of a first embodiment of the present invention.

It is believed that a clearer understanding of the present invention can be obtained by first reviewing briefly the overall system of a first example of the present invention, as shown in FIG. 1. The discussion of the overall system of the first example will be followed by a more detailed description of a group of components shown in FIG. 2, which are typically found in related wind turbine apparatus, and some or all of which can be incorporated in one or more of the examples of the present invention described herein. The discussion of the related wind turbine components will then be followed by a more detailed description of a number of examples of systems incorporating the principles of the present invention.

A. General Description of First Example

To proceed now with the more general description of the first example, as indicated above, this will be done with reference to FIG. 1. There is a wind turbine assembly 10 which comprises a base support section comprising a vertically aligned tower 11 which is supported by a base 12. At the upper end of the tower 11, there is a power generating main support structure 13 which is rotatably mounted to the tower 11 to rotate about a vertical axis of rotation 14 centrally located in the tower 11. This support section 13 provides a support for a power generating section 16 of the first example, and it may be in the configuration of a nacelle 13 commonly used with wind turbines.

The entire power generating section 16 comprises a blade section 18, a rotary speed changing drive section 20, a generator section 22, and an auxiliary power section 24. The blade section 18 comprises a plurality of turbine blades 28, and a hub or rotor 30 to which the blades 18 are connected.

The blade section 18 and the speed changing drive section 20 can be grouped as the primary power generating portion while the auxiliary power section 24 (as well as the auxiliary power or back up power components, including those that are shown in other examples) can be considered as being in a secondary power generating portion.

The primary and secondary power generating portions together function in a manner to enable the generator 22 to provide firm power.

B. Summary of Related Components

Figure 3:
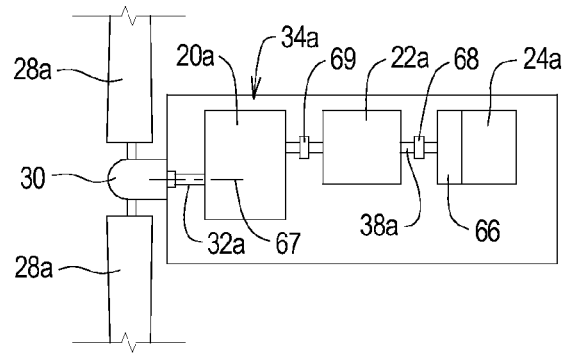
FIG. 3 is a somewhat schematic view of a power generating section 16 of the first embodiment.
Figure 2:
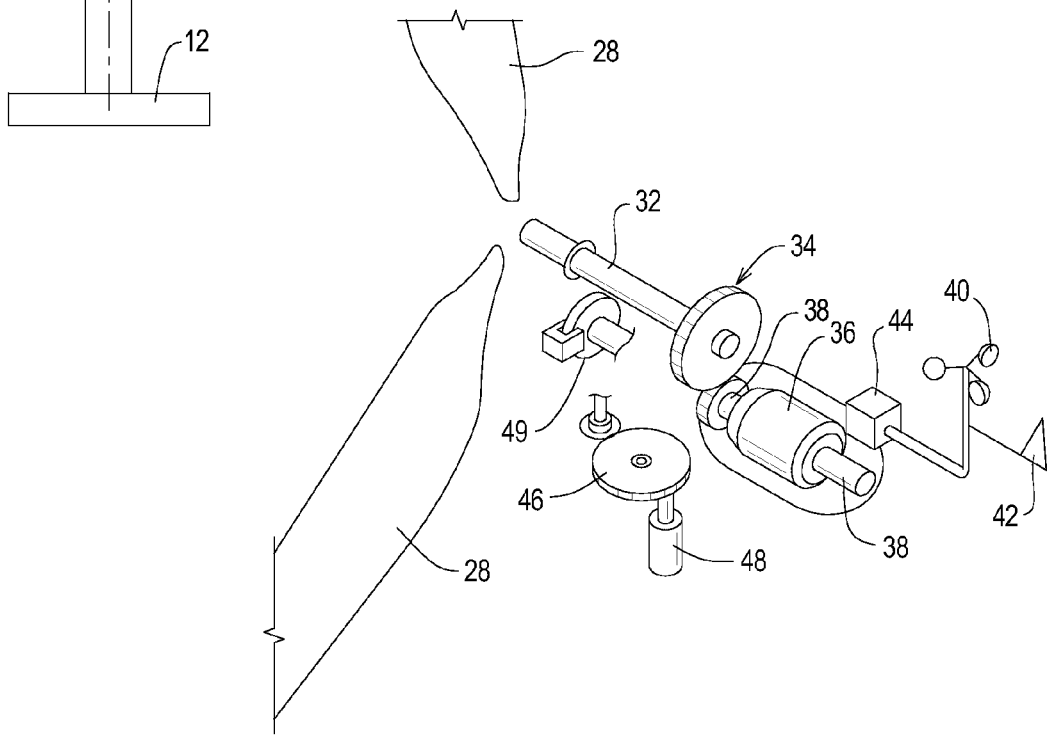
FIG. 2 is an isometric exploded view showing the components of a typical wind turbine apparatus, some or all of which can be combined with the wind turbine apparatus of the embodiments of the present invention.

With the overall description of this first example being presented, attention is now directed to FIG. 2, which, as indicated above, is an exploded drawing of a number of components which in themselves exist in the prior art and are commonly used in present day wind turbines. In FIG. 2 only two of the three blades 28 are shown and the rotor 30 is not shown. There is a low speed shaft 32, which (as shown in FIG. 3) connects to a speed changing drive section 34 which is shown somewhat schematically, and (as its name implies) provided a power output at a higher RPM than that of the shaft 32.

This drive section 34 is commonly in the form of a gear section. In general, the rotational speed of the low speed shaft 32 would be between about 30 to 60 rotations per minute, and the gear section 34 is in turn connected to the generator 22 to cause it to rotate at a speed between about 1,200 to 3,600 RPM. This would typically be a rotational speed required by a large number of present day generators to produce electricity. The gear section 34 connects to a shaft 38 which is located in the generator 22.

There is provided an anemometer 40 which measures the wind speed, and also a wind vane 42 to ascertain wind direction. Both the wind speed and the wind direction data are transmitted to a controller 44. The controller 44, as its name implies, performs various control functions. For example, it controls a yaw drive 46 and its associated motor 48 to keep the blade section 18 facing into the wind as the wind direction changes, starts and stops the wind turbine, etc. There is also provided a disc brake 49 for the low speed shaft 32, and in the prior art this can be applied mechanically, electrically, or hydraulically to stop the rotation of the rotary components in emergencies.

All, or most all, of the components which are shown in FIG. 2 are, or may be, present in the examples of the present invention. However, for convenience of illustration (e.g., to avoid cluttering up the drawings), these are not shown in the following drawings (FIGS. 3-11) which illustrate a number of examples of the present invention.

C. First Example

All (or many) of the components of this first example are shown in at least one of FIGS. 1, 2 and 3. Reference is now made to FIG. 3. It will be noted that a number of the components which appear in FIG. 3 also appear in either FIG. 1 or 2. For clarification, those components in FIG. 3 which already appear in either or both of FIGS. 1 and 2, are given like numerical designations, with an "a" suffix distinguishing those particular components. Then the components which appear in FIG. 3 and which do not appear in either FIG. 1 or 2 will be given new numerical designations.

To proceed now with a description of the first example of FIG. 3, as in FIG. 1, there are the blades 28a which are attached to the hub 30a. The hub 30a in turn connects to and drives the low speed shaft 32a. The low speed shaft 32a in turn drives the speed changing drive section 20a which then provides a high rotational speed power output to the generator 22a.

The components of this first example described in the paragraph immediately above, are already found in FIG. 1 or 2. In FIG. 3 there is also shown an auxiliary drive section 24a capable of providing a drive output to the generator 22a.

For convenience of description, in describing the location of the components in FIG. 3, the hub 30a shall be considered to be a front or forward location, and the location of the auxiliary drive unit 24a shall be considered as having a rear location. Also, the axis of rotation of the hub 30a, the blades 28a, and also of the low speed shaft 32a, and any other components which rotate on the same axis, shall be designated the "power generating axis of rotation 67".

To return now to the description of this first example, the auxiliary drive unit 24a provides a rotating drive output to a torque converter 66. The torque converter 66 in turn has a drive connection to an overrunning drive member 68 (which can be simply an overrunning drive clutch) that in turn connects to the rear end of the high speed shaft 38a of the generator 22a. Then the forward end of the shaft 38a of the generator 22a connects to a forward overrunning drive member 69 that connects to the drive output of the speed changing drive section 34a. The torque converter 66 located between the auxiliary drive unit 24a and the generator 22a may or may not be required and depends on the design speed of the generator 22a and the auxiliary drive unit 24a. If the operating speed of the auxiliary drive unit 24a is a close match to the generator 22a operating speed, the overrunning clutch 68 would provide an adequate method of coupling the generator 22a to the auxiliary drive unit 24a.

There are many types of conventional drives that could function as the auxiliary drive unit 24a. For example, this could include an internal combustion engine, external combustion engine, steam turbine, steam engine, or hybrid drive. The most common types of drives would include, but not be limited to, gasoline engines, diesel engines, natural gas engines, gas turbine engines, steam turbines, steam engines, sterling engines, gas expanders, or hydraulic or electric motors with a nearby source of power or hydraulic energy. Sources of energy for the auxiliary drive unit 24a could include gasoline, diesel, jet fuel, heavy oil, natural gas, propane, hydrogen, ethanol, coal, wood, or any other energy source suitable for the auxiliary drive or its cooperating equipment.

D. Operation of First Example

To describe now the operating features of this first example, let us review three different situations, namely: i. the wind is at a sufficient velocity so that it is able to generate sufficient power to produce the desired power output of the generator 22a; ii. the wind velocity is not sufficient to drive the blade section at all, and the auxiliary drive section 24a is activated to generate the needed electric power; and iii. the wind velocity is such that it is able to rotate the blade section 18a to generate only an electrical power output which is below the desired output of the generator 22a, and to obtain the desired level of the total electrical power output, it is necessary to operate the auxiliary drive section 24a.

In the first situation (where the wind power is at a sufficiently high level), the blade section 18a is rotated to drive the blade sections 18a at full power output or near full power output. More specifically, the blade section 18a is rotating with sufficient power output so that the speed augmenting drive section 20a is acting through an overrunning clutch 69 to drive the generator 22a at a sufficient power output so that sufficient electrical power is developed. The overrunning drive section 68, which connects to the shaft 38a of the generator 22a, simply overruns its connection to the auxiliary drive section 24a, thus, the auxiliary drive section 24a remains stationary.

Let us now take the second situation where there is either no wind or such a small velocity of the wind that the blade section 18a is put in a position where it is stationary or simply not rotating. In this situation, the auxiliary drive section 24a is activated manually or automatically so that its rotational output is directed through the torque converter 66, which in turn acts through the overrunning drive 68, which is caused to rotate in a direction so that it drives the generator 22a.

At the same time, the speed changing drive section 20a remains stationary, and since the connection between the drive section 20a and the generator 22a is the overrunning drive member 69, the generator 22a is able to operate to rotate in a manner so that it has no drive connection with the drive section 20a and is driven totally by the auxiliary power unit 24a.

Let us now consider the third situation, which is that the wind generated power is great enough to achieve a useful lower power output level, but is not great enough to meet the desired power output. In this instance, the auxiliary drive section 24a would be utilized to cause rotation of its torque converter 66 to act through its drive member 68 and provide power to the rear end of the shaft 38a of the generator 22a.

At the same time, the pitch of the blades 28*a* could be set at an angle of attack to optimize the power output that is developed by the use of both power sources. The effect of this is that the shaft 38*a* of the generator 22*a* would be driven at both its front and rear end portions, so that there would be sufficient power to generate the desired electrical power output.

Also, in this third operating mode, the two overrunning drive members (drive clutches) 68 and 69 are operating in their engaged position, so that these are providing rotational forces to the generator 22*a* at a sufficiently high power output.

E. Applications of First Example

Let us now turn our attention to some of the possible applications of the system of the first example of the invention (i.e., the various ways it might be used). As indicated earlier in this text, one of the drawbacks of a wind turbine is that it produces power intermittently. Thus, this puts wind power in the category of "non-firm energy producers". However, by combining the wind power turbine in the combination of this first example, this now becomes a source of firm power that could supply energy to a power grid on a continuous basis.

Another situation of possible use is where there is a municipality which needs a reliable source of electricity. With the system of the first example, the system could be engineered so that the auxiliary power source by itself could generate an adequate level of electric power. In that situation, the auxiliary power source would be able to operate as the sole power source in that time interval when the wind turbine power source would be idle. Then as the wind energy was available, the system could be operated in the mode mentioned above as Mode 1 or Mode 2 where the electric power output would be entirely from the wind turbine or as Mode 3, a dual drive mode, where the combined operation of both the wind turbine and the auxiliary power section are utilized to drive the generator 22*a*.

From the above comments, it becomes apparent that only the one generator 22*a* would be needed in each of the three modes. There are various expenses incurred in providing electric power through a generator, such as the cost of switchgear, transformers, etc. With this arrangement of this example, that extra expense is alleviated by utilizing the same generator for: i) the "only wind power mode"; ii) the "sole auxiliary power mode"; and iii) the "combined wind power/auxiliary power mode".

It is to be understood that all of the components (or a large number of the components) that are shown in FIG. 2 could be utilized also in each of the several examples of the present invention.

i) Generator Types

To comment generally on the generator 22*a*, wind turbines are supplied with several different types of generators, including induction generators, double fed induction generators (for speed control), variable slip induction generators (for limited changes in speed), synchronous generators (directly and indirectly connected), and DC generators (typically small wind turbines). Most wind turbines in service are standard induction generators which are constant speed machines. Variable speed generators, with the exception of DC generators, can be held at a fairly constant speed with the control system. This is a plus for the operation of the auxiliary drive in that the additional energy input to the generator does not change the generator speed appreciably. Additional torque input to the generator simply causes more power output from the generator. The DC generator is not considered an ideal candidate for the auxiliary drive as too much torque from the auxiliary drive could speed up the wind turbine to the point where the wind would not contribute to energy production.

ii) Auxiliary Drive Considerations

To comment generally about the different possibilities of the auxiliary drive 24*a*, it could be coupled directly to the generator via a torque converter or overrunning clutch or it can be connected through a gearbox, again using a torque converter or overrunning clutch. In most cases, an overrunning clutch will be sufficient; however, if there is a need to run the engine at constant speed and vary the output shaft speed to the generator, a torque converter can be used. If the wind turbine is at rest (zero speed) and the operator wishes to run the generator, he can start the auxiliary drive 24*a*. Because the generator is at rest, the overrunning clutch will engage the generator as soon as the auxiliary drive commences startup. The generator rotor will rotate along with the auxiliary drive shaft during startup and will continue to rotate at the same speed as the auxiliary drive at all times.

To connect the generator to the grid, the auxiliary drive must speed the generator rotor up to a speed that matches the generator rotating magnetic field. At that point the generator breaker can be closed to connect the generator to the grid. Any additional power input from the auxiliary drive to the generator will cause power to flow out of the generator to the grid. An alternate method of starting up the generator would be to use the soft start feature supplied with most large scale wind turbines to connect them to the grid. In this case the wind must be used to rotate the propeller, gear, and generator to get it close to the normal operating speed before closing the breaker. In some cases the soft start feature can be used to start the generator from dead stop. In this case, the generator acts as a motor until it gets up to speed at which time the wind energy input causes power to flow out from the generator.

If the auxiliary drive had a torque converter, the operator could start the auxiliary drive and run it up to operating speed before engaging the torque converter to spin up the generator. With the torque converter the engine speed could be changed and the output shaft speed from the torque converter could be held at a constant speed or, conversely, the engine speed could be kept constant and the output speed could be varied along with the generator speed.

The generator can be driven from the wind turbine end, the auxiliary drive end, or both ends at the same time. The generator will not know the difference. It only knows that torque is being applied to its rotor to generate electricity. It would be possible to use the auxiliary drive to reduce the impact of wind gusts on the wind turbine. This could be done by applying a certain amount of power from the auxiliary drive which is over and above the power being supplied to the generator from the wind. In this case the wind turbine would not be supplying full rated power to the generator. When a wind gust hits the wind turbine and increases the generator output and causes high loads on the gearbox, the auxiliary drive would receive a governor signal to reduce its power output so the generator and gear do not experience damaging load increases. Wind turbine manufacturers are constantly working on improvements to minimize the damaging effects of wind gusts and would welcome new solutions to the problem. The current methods to control the effect of wind gusts are associated with the electrical control systems and generators. Variable slip generators are used to help solve the wind gust problem by allowing the generator to temporarily speed up (increased generator slip) to allow the additional wind energy to be converted into kinetic energy and not forcing the energy through the generator. It would be like installing a clutch between the wind turbine propeller shaft and gearbox to allow the clutch to slip during wind gusts to avoid damage to the gears.

iii) Structural Considerations

An additional benefit of the auxiliary drive arrangement is to change the center of gravity of the nacelle. The auxiliary drive acts as a counterweight on the opposite end of the nacelle as the propeller, hub, shaft and gearbox. Due to the extreme weight of those components, the wind turbine nacelle must be positioned to keep its center of gravity above the center of the tower. This means the propeller is positioned quite close to the tower which causes the propeller blades to bend every time they pass by the wind turbine support tower. The wind shadow and flexing of propeller blades has caused fatigue failures of blades in the past. The weight of the auxiliary drive on the opposite end of the nacelle would allow the nacelle to be repositioned so that the propeller blades are farther away from the tower and less susceptible to flexing and fatigue failures.

F. Second Example

Figure 4:
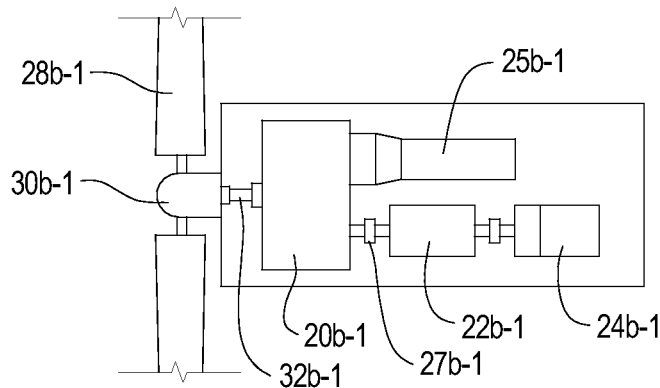
FIGS. 4, 4A and 4B are views similar to FIG. 3 showing a second embodiment illustrating alternate locations for the auxiliary drives.
Figure 4A:
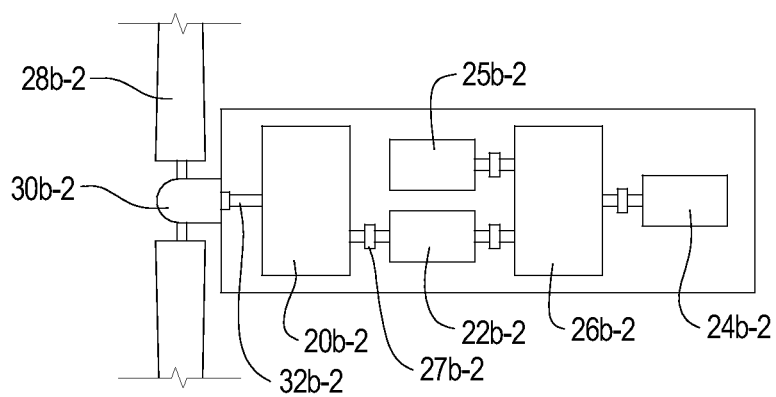
Figure 4B:
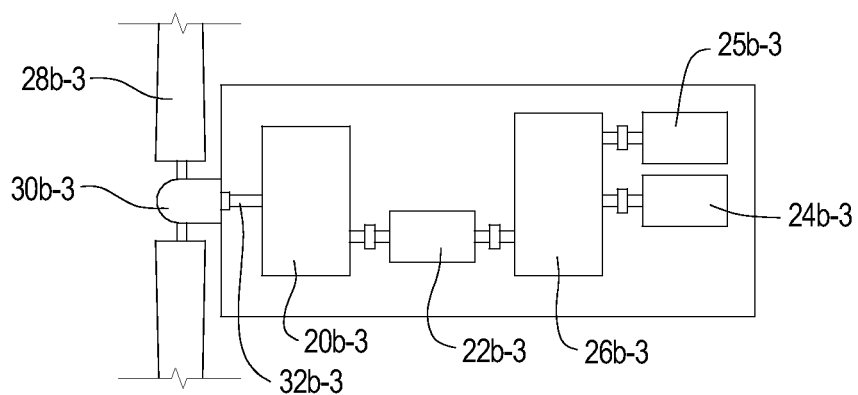

Reference will now be made to FIGS. 4, 4A and 4B which are different configurations of this second example.

The second example is similar to the first example except that some of the auxiliary drive components are placed in different relative positions, and an auxiliary drive speed changing section is added in FIGS. 4A and 4B to allow the installation of two auxiliary drives. An example of the foregoing would be the installation of a natural gas engine as an auxiliary drive and a steam turbine as the second auxiliary drive. The second auxiliary drive would be part of an energy recovery system that would recover waste heat from the first auxiliary drive and convert the waste heat into steam. The steam would then be used as an energy input to the second auxiliary drive. Another example of a use for a second auxiliary drive would be a solar/wind hybrid wind turbine shown in FIG. 7 where steam generated in the solar collector is routed to the second auxiliary drive (steam turbine) to provide additional power to the generator.

Components of this second example which are the same as, or similar to, components shown in FIGS. 1, 2 and 3, will be given like designations with a "b" suffix distinguishing those of the second example, and the newly mentioned components are given new numerical designations. Further, to distinguish between the three different versions, in the version of FIG. 4, a suffix of "b-1" will distinguish those of the version of FIG. 4, a suffix of "b-2" will distinguish those of the second version of 4A, and the suffix of "b-3" will distinguish those of the third version of FIG. 4B.

All three of these versions of the second example have the following components, the blades 28b, the hub 30b, the low speed shaft 32b, the speed changing section 20b, the generator section 22b, and the auxiliary drive section 24b. In FIG. 4, all of these components are arranged in substantially the same way as corresponding components in FIG. 3, except that there are two auxiliary drive sections 24b-1 and 25b-1. Other specific features are the same, such as having the torque converter and overrunning clutches located in substantially the same manner as in the first example of FIG. 3.

The first version of the second example of FIG. 4 differs from the first example in that in addition to the auxiliary drive 24b-1 there is a second auxiliary drive 25b-1 which connects to the speed changing drive section 20b-1. Power from the auxiliary drive 25b-1 is transmitted through the speed changing drive section 20b-1 to the generator 22b-1 for additional power output. In FIG. 4 an overrunning clutch 27b-1 must be installed to de-couple the wind turbine shaft 32b-1 from the speed changing drive 20b-1 when there is insufficient wind to rotate wind turbine shaft 32b-1.

In FIG. 4A the second version of FIG. 4, we have the same components of the wind turbine blades 28b-2, the hub 30b-2, the low speed shaft 32b-2, the speed changing section 20b-2, the generator section 22b-2, and the auxiliary power section 24b-2. FIG. 4A differs from FIG. 4 in that there is provided a second speed changing section 26b-2 which has an operative connection to the auxiliary drive section 24b-2. Then there is a second auxiliary drive section 25b-2 which also has an operative connection through the second speed changing section 26b-2. The second auxiliary drive section 25b-2 provides additional power to generator 22b-2 as available from energy recovery systems or energy generation systems other than wind, which are part of the hybrid wind turbine system.

FIG. 4B has substantially the same components as in FIG. 4A, except that in addition to the auxiliary drive section 24b-3 transmitting power through the second speed changing section 26b-3, the second auxiliary drive section 25b-3 is located on the same side of the second speed changing section 26b-3. In other respects, it functions the same way as the second version of FIG. 4A.

G. Third Example

Figure 5:
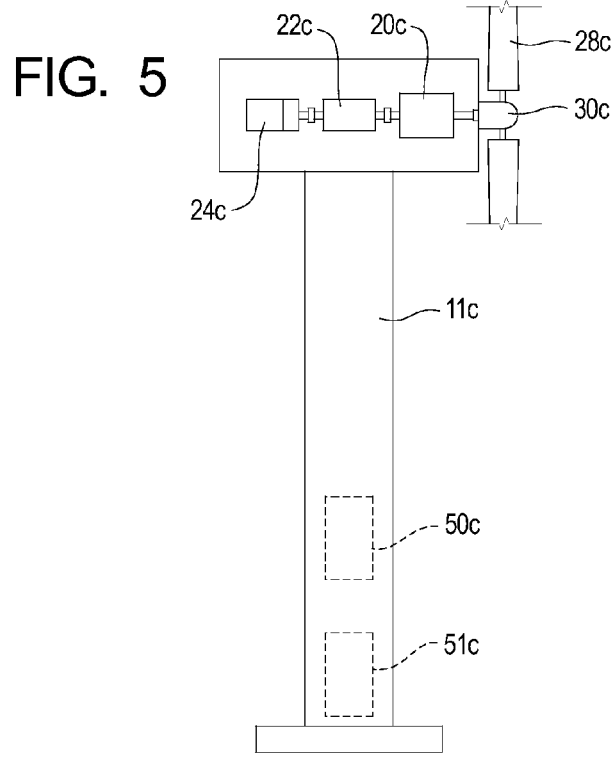
FIGS. 5 and 5A are views similar to FIGS. 1 and 3, showing a third embodiment which shows a heat recovery section in the support tower.

A third example of the present invention will now be described with reference to FIGS. 5 and 5A. Components of this third example which are the same as, or similar to, components of the earlier examples will be given like numerical designations, with a "c" suffix distinguishing those of the third example.

In this third example, the basic system as shown in FIG. 3 is used, so that the main components and their functions of this third example are substantially the same as in the third example as they are in the first example. However, the added feature is that the auxiliary engine drive is combined with two stages of an organic rankine cycle heat recovery system to increase the overall efficiency of the engine drive.

In this example the two stages of heat recovery 50c and 51c are located in the wind turbine support tower 11c.

With this system, the heat recovery process captures waste heat from the auxiliary engine 24c exhaust and the auxiliary engine 24c coolant. Also, the waste heat is converted into useful electricity using a separate turbine and generator which is part of the heat recovery system located in the tower 11c.

Figure 5A:
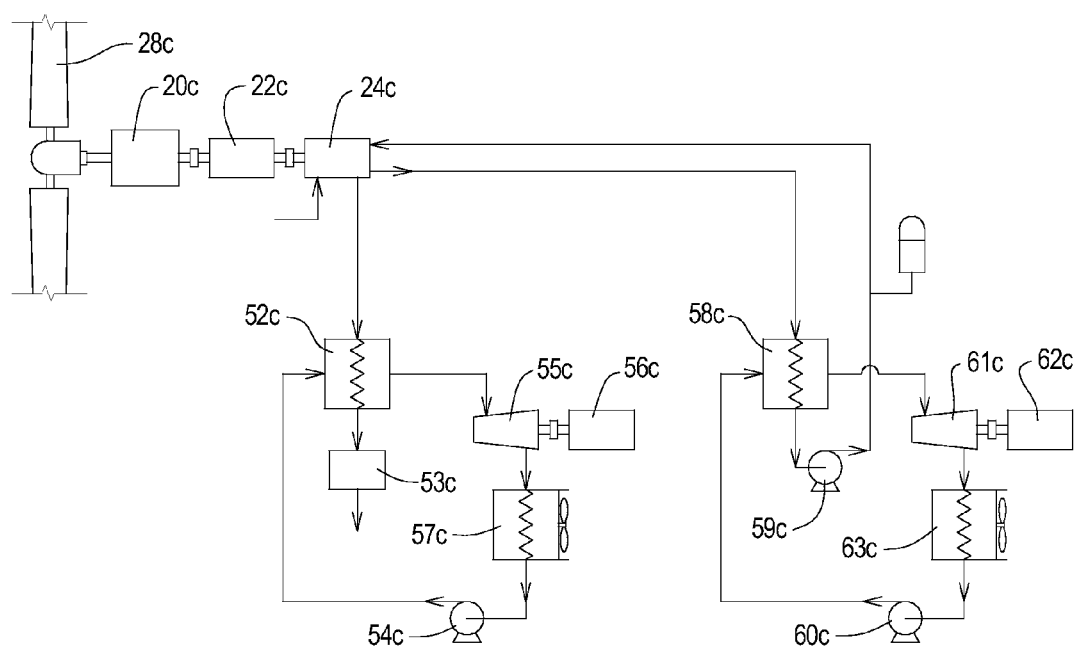

In FIG. 5A the hot exhaust from auxiliary drive engine 24c flows to an organic rankine cycle boiler 52c to vaporize the organic working fluid. The cooled exhaust then flows to an emission control unit 53c before being discharged to atmosphere. The rankine cycle involves a boiler feed pump 54c which pumps the organic working fluid to the boiler 52c for vaporization. The vapor then flows to the expansion turbine 55c which is coupled to a generator 56c. Power from the generator 56c is connected to the wind turbine electrical switchgear. The vapor then flows out of the expansion turbine to the air cooled condenser 57c where it is condensed back into a liquid. The liquid working fluid then flows back to the boiler feed pump 54c for recirculation.

In this example the auxiliary drive engine coolant is routed from auxiliary drive engine 24c to an organic rankine cycle boiler 58c to vaporize the organic working fluid. The cooled engine coolant is then pumped back to engine 24c using coolant circulation pump 59c. The rankine cycle involves a boiler feed pump 60c which pumps the organic working fluid to the boiler 58c for vaporization. The vapor then flows to the expansion turbine 61c which is coupled to a generator 62c. Power from the generator 62c is connected to the wind turbine electrical switchgear. The vapor then flows out of the expansion turbine 61c to the air cooled condenser 63c where it is condensed back into a liquid. The liquid working fluid then flows back to the boiler feed pump 60c for recirculation.

With the conversion of waste energy into additional electricity, the auxiliary drive 24c is a very efficient source of additional power for the hybrid wind turbine.

H. Fourth Example

Figure 6:
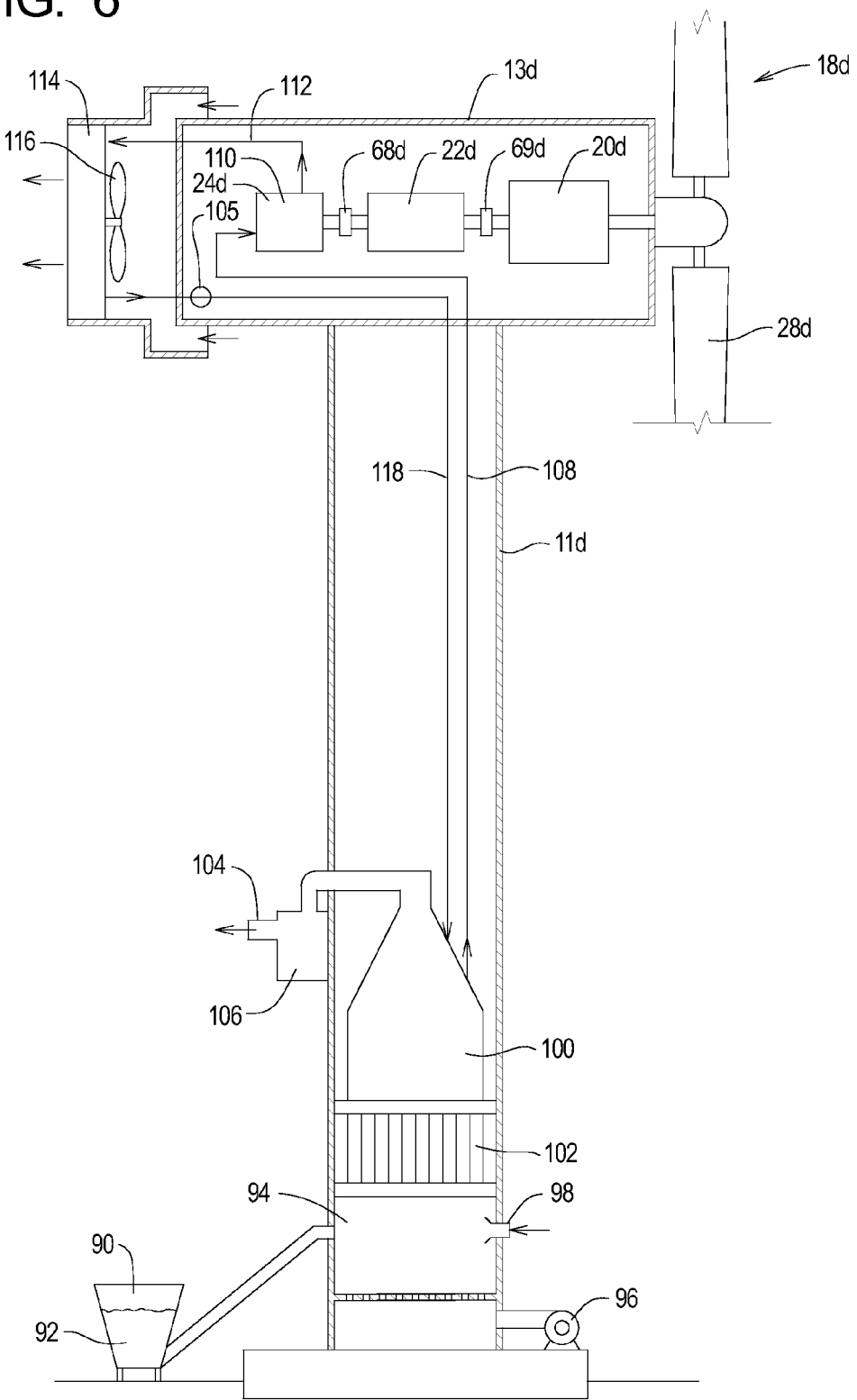
FIG. 6 shows yet a fourth embodiment of the invention, where a steam generator and steam turbine are utilized as the auxiliary power source.

FIG. 6 shows a fourth example of the present invention. Components of this fourth example which are the same as, or similar to, components of the earlier example will be given like numerical designations, with a "d" suffix distinguishing those of the fourth example. This fourth example has the same basic operating components as shown in the first example, except that in this fourth example, the auxiliary drive section 24d is steam powered. Further, the steam that is generated to supply the power is generated by a boiler that is located in the support tower 11d. The fuel can be solid fuel, liquid fuel, gaseous fuel, or other fuels.

As shown in FIG. 6, there is the support structure 13d mounted to the tower 11d, the blade section 18d, a speed changing drive section 20d, and a generator 22d. There are also the two overrunning drive members 68d and 69d on opposite sides of the generator 22d.

There is a solids fuel hopper 90, which directs the solid fuel 92 into a furnace area 94, where there is a forced draft generated by the fan 96. Further, there is a liquid and/or natural gas burner 98, a steam drum 100, a mud drum 102, a boiler flue gas discharge 104, and a bag house 106. There is a steam conduit 108 leading to a steam drive turbine 110. The steam drive turbine 110 is positioned to supply power to the generator 22d. The steam exhaust from the steam turbine 110 flows along a conduit 112 to an air cooled surface condenser 114 and is cooled by a fan 116. The condensate then flows to the feed water pump 105 and back to the boiler steam drum 100.

I. Fifth Example

A fifth example of the present invention will now be described with reference to FIG. 7. Components of this fifth example which are the same as, or similar to, components of any of the earlier examples will be given like numerical designations, with an "e" suffix distinguishing those of this fifth example.

In this fifth example, there is a solar thermal power source in addition to the wind turbine power and also the auxiliary power section. In this case, there would be three sources of power to drive the generator, namely: i) wind; ii) solar generated power; and iii) the auxiliary drive section which, as indicated previously in this text, could be fueled by a wide variety of energy sources, such as an engine driven by diesel fuel, natural gas, ethanol, etc.

The wind and solar energy inputs would produce non-firm energy that cannot be depended upon as a constant source of power. However, the auxiliary drive 24e (engine or turbine) would be the ultimate backup for firm power generation. Thus, with these three options offered with the wind turbine, the customer could purchase a basic wind turbine, a wind turbine with a solar thermal energy drive, a wind turbine with an engine or turbine (steam, gas turbine, etc.) auxiliary drive, or a wind turbine with both a solar thermal energy drive and an engine or turbine drive. Thus, different sources of energy input to the wind turbine are not mutually exclusive and can cooperate to maximize the output of the wind turbine. With that background information having been given, FIG. 7 shows the basic components that are shown in the first example of FIG. 3, and the components discussed above with reference to FIG. 7.

Thus, there is the source of firm power in the form of an auxiliary drive engine 24e or other power source (see FIG. 7A).

In this example, in FIG. 7 there is the tower 11e which supports the rotatably mounted support structure 13e, the speed changing drive section 20e, and the generator 22e. FIG. 7 shows the engine auxiliary drive 24e-1 and the auxiliary drive 25e-1 in the form of a steam turbine. There is a condenser 152 which directs the condensate to the boiler feed pump 134.

To provide the solar energy, FIG. 7 shows there is a plurality of heliostats 130 which reflect the sun rays in a converging pattern to a solar absorber 132 that is mounted in the tower 11e. FIG. 7 shows there is a boiler feed pump 134 which pumps water or other liquid up through the solar absorber 132 to a steam drum 136 so that the steam can be separated from the steam and water mixture generated in the solar absorber 132. The steam or other gaseous drive medium then travels upwardly to a steam turbine 25e-1. The steam turbine auxiliary drive 25e-1 provides a rotary power output to the generator 22e-1 in combination with the engine auxiliary drive power output 24e-1, or through another operative connection to the generator 22e-1.

In operation, either or both of the non firm power sources (i.e., the wind power source and the solar power source) are utilized to provide the energy output to rotate the generator 22e-1. In the event that either or both of the wind power and solar power are absent because of the surrounding weather environment, and are producing no usable power, or only a smaller output of power, then the auxiliary power source 24e-1 can be used to supplement the power input to an adequate level. However, if the solar power source and/or the wind power source are adequate, then the auxiliary power section 24e-1 will not be required.

J. Sixth Example

Figure 8:
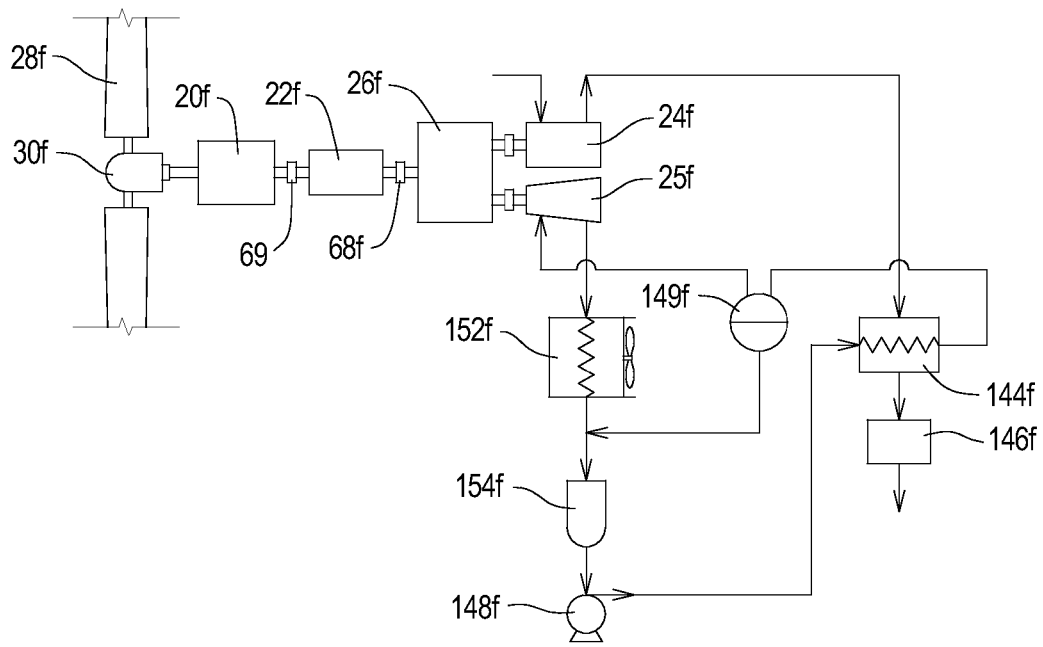
FIG. 8 is similar to FIG. 7 in that it shows a basic wind turbine system which also utilizes an engine auxiliary drive with heat recovery and an associated steam turbine auxiliary drive.

A sixth example of the present invention will now be described with reference to FIG. 8. Components of this sixth example which are the same as, or similar to, components of any of the earlier examples will be given like numerical designations with an "f" suffix distinguishing those of this sixth example.

In this sixth example, there is an addition of a steam rankine cycle heat recovery system to recover heat from the engine auxiliary drive exhaust. To describe this sixth example, reference is made to FIG. 8.

Hot engine exhaust leaving the auxiliary drive exhaust flows to a heat recovery steam generator 144f where the heat in the exhaust generates steam. The cooled exhaust then flows to the emission control unit 146f for treatment before it is discharged to atmosphere.

A boiler feed water pump 148f pumps water to the heat recovery steam generator 144f to raise steam. The steam and water mixture flows to a steam drum 149f, which is part of the heat recovery steam generator 144f, to allow the steam to separate from the mixture and flow to a steam turbine auxiliary drive 25f. This steam turbine 25f converts the steam energy into mechanical work by turning the turbine wheel and driving the auxiliary speed changing drive section 26f and the generator 22f through overrunning clutches 68f and 69f.

After giving up a portion of its energy to the steam turbine 25f, the steam flows to an air cooled condenser 152f where it is condensed back into water. The steam condensate then flows through a vacuum deaerator 154f for oxygen removal before flowing to the boiler feed water pump 148f which pumps the feed water back to the heat recovery steam generator 144f to generate more steam.

The addition of the heat recovery system to the engine auxiliary drive increases the overall thermal efficiency of the engine auxiliary drive. Several types of steam drivers can be used to drive the generator. An example of an alternate type of steam drive would be a rotary screw steam drive machine.

K. Seventh Example

A seventh example of the present invention will now be described with reference to FIG. 9. Components of this seventh example which are the same as, or similar to, components of earlier examples will be given like numerical designations, with a "g" suffix distinguishing those of this seventh example.

This seventh example comprises a solar thermal energy system which combines the benefits of wind power with solar power using the same turbine structure.

In this example, the entire solar thermal energy system is separated from the wind turbine power generation system. The solar thermal system uses an organic ranking cycle heat recovery system to convert solar energy into electricity. FIG. 9 shows the process flow for the solar thermal system. The system components can be located in the support tower or the nacelle substructure of the ninth example.

Figure 9:
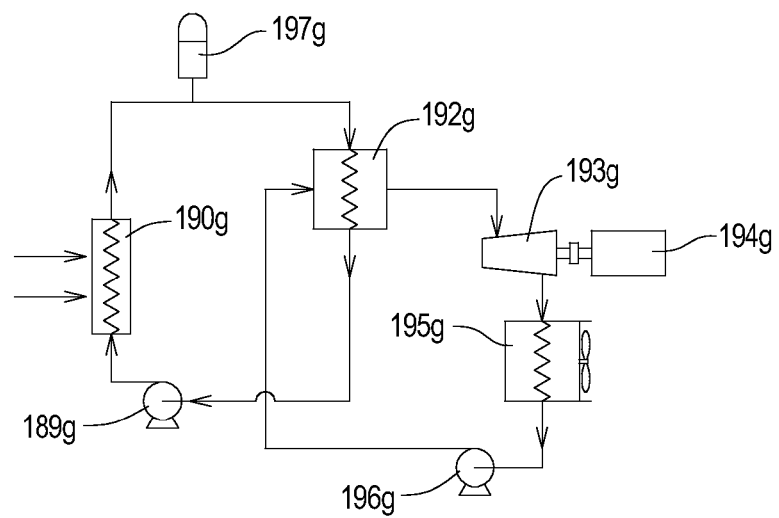
FIG. 9 shows a system for a solar thermal energy system which is independent of the wind turbine power generation system but occupies the same wind turbine structure.

As shown in FIG. 9 there is a solar energy input to a solar absorber 190g which provides heat to a high temperature heat transfer fluid which is pumped through the absorber 190g using circulating pump 189g. The heat transfer fluid then passes through a heat exchanger 192g where it vaporizes the organic rankine cycle working fluid. The cooled heat transfer fluid then flows back to the circulation pump 189g where it is pumped back to the solar absorber 190g. The vaporized organic fluid flows out of the heat exchanger 192g and into the expander turbine 193g. The expander turbine 193g is coupled to a generator 194g which produces electric power. The vaporized working fluid, usually propane or butane, passes through the expander turbine to a condenser 195g where it is condensed back to a liquid. The liquid then flows to a pump 196g which pumps the working fluid back to the exchanger 192g for conversion back into a vapor. An expansion tank 197g is provided to allow for the expansion of the heat transfer fluid in the solar thermal system.

In addition to the cost savings of combining the wind and solar energy systems in one structure, the solar addition to the wind turbine has the added benefit of providing additional power output during the daylight hours when it is needed most.

L. Eighth Example

An eighth example of the present invention will now be described with reference to FIG. 10. Components of this eighth example which are the same as, or similar to, components of earlier examples will be given like numerical designations, with an "h" suffix distinguishing those of this eighth example.

This eighth example comprises a solar thermal energy system and an engine system with heat recovery which combines the benefits of wind power, solar power, and engine power using the same wind turbine support structure.

Figure 10:
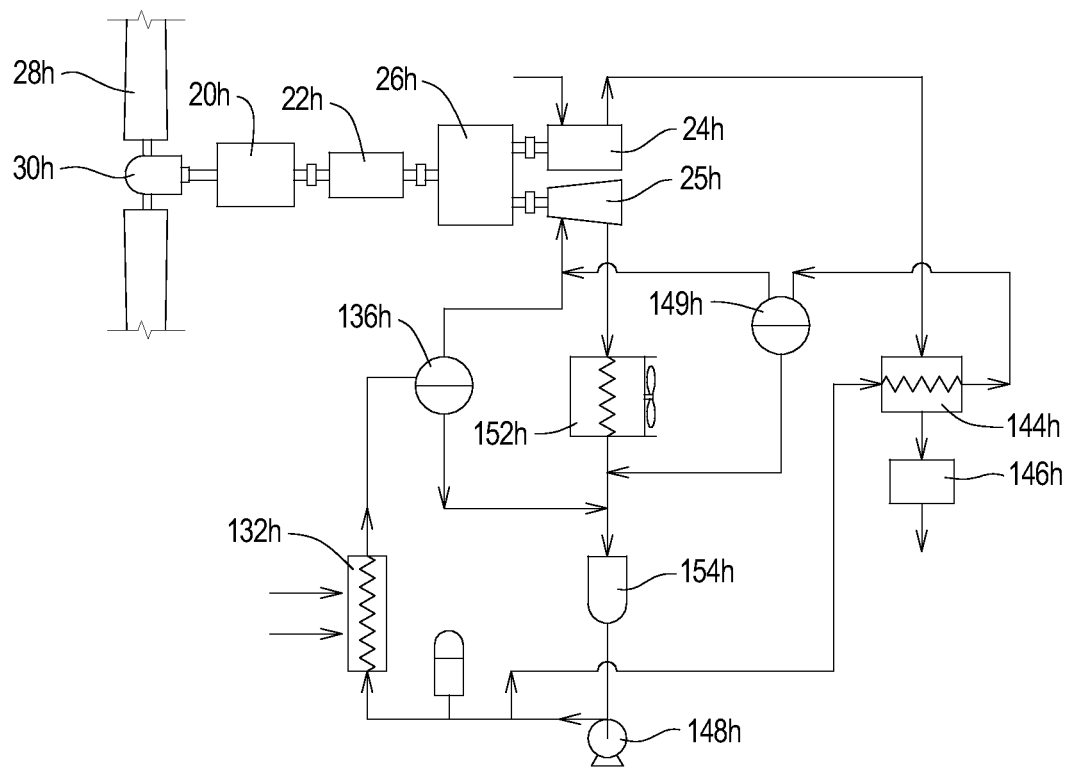
FIG. 10 is a combination of FIGS. 7 and 8 in that it shows a basic wind turbine energy system which utilizes an engine auxiliary drive with heat recovery, an associated steam turbine auxiliary drive, and a solar thermal energy system which uses the same steam turbine.

FIG. 10 shows the process flow for the combined solar thermal system and engine system with heat recovery. In the engine plus heat recovery system, hot engine exhaust leaving the engine 24h flows to a heat recovery steam generator 144h where the heat in the exhaust generates steam. The cooled exhaust then flows to the emission control unit 146h for treatment before it is discharged to the atmosphere. A boiler feed water pump 148h pumps water to the heat recovery steam generator 144h to raise steam. The steam and water mixture flows to a steam drum 149h, which is part of the heat recovery steam generator 144h, to allow the steam to separate from the mixture and flow to the steam turbine auxiliary drive 25h. The steam turbine 25h converts the steam energy into mechanical work by turning the turbine wheel and driving the gear 26h and generator 22h through overrunning clutches. After giving up a portion of its energy to the steam turbine 25h, the steam flows to an air cooled condenser 152h where it is condensed back into water. The steam condensate then flows through a vacuum de-aerator 154h for oxygen removal before flowing to the boiler feed water pump 148h which pumps the feed water back to the heat recovery steam generator 144h to generate more steam.

In the solar thermal system, the solar energy input to a solar absorber 132h is converted into steam which drives a steam turbine 25h which is coupled to the wind turbine main generator 22h. The steam then exits the steam turbine 25h and flows to an air cooled condenser 152h where the steam is condensed back into water. The water then flows through a vacuum deaerator 154h to remove oxygen and then to the feed water circulating pump 148h where it is pumped back to the solar absorber to generate more steam.

M. Ninth Example

Figure 11:
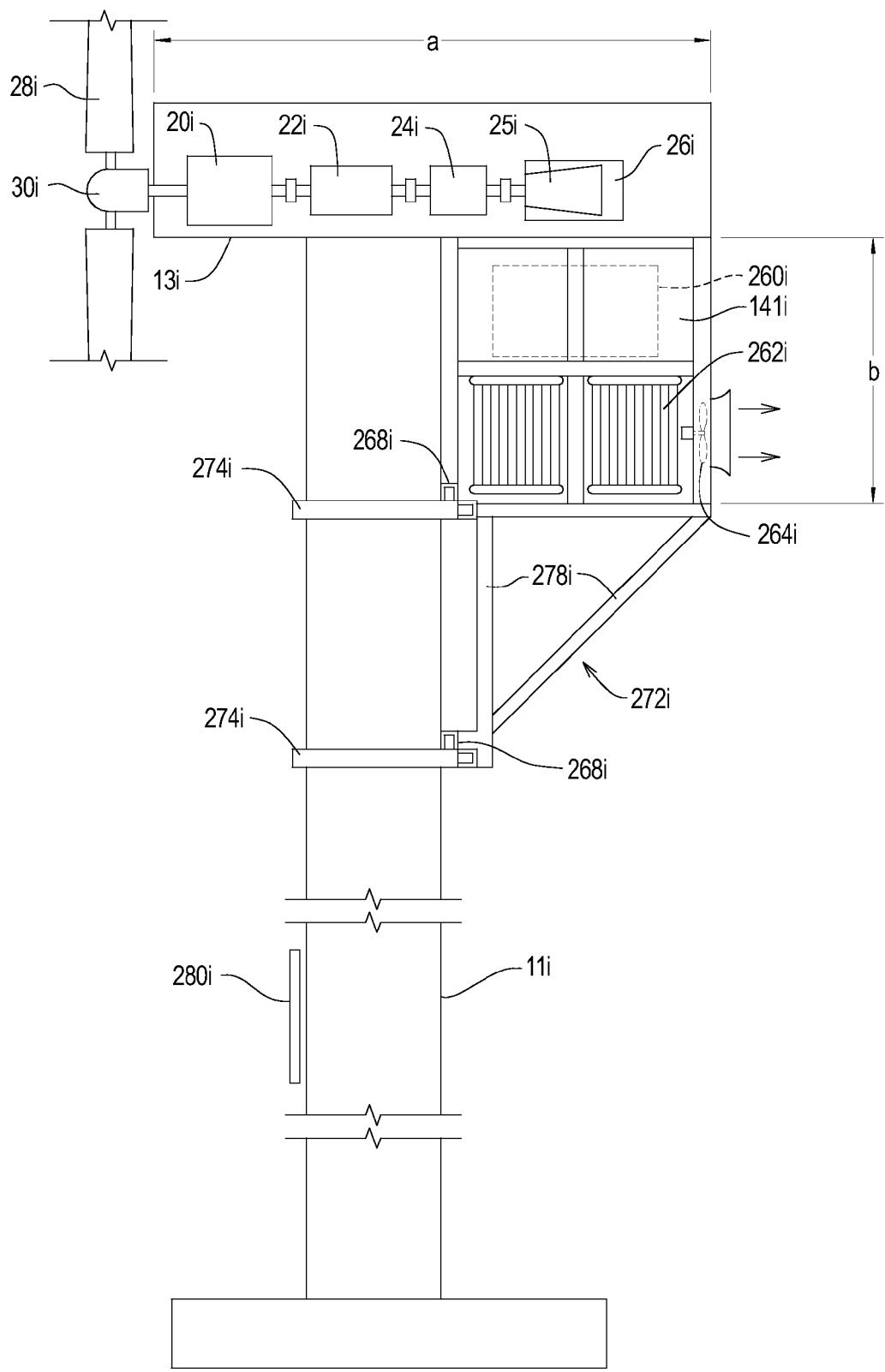
FIG. 11 shows a basic wind turbine system with the addition of the nacelle substructure for housing additional heat recovery and power generation equipment.

This ninth example of the present invention will now be described with reference to FIG. 11. Some of the components in this ninth example which are substantially the same as, or similar to, corresponding components of earlier examples will be given like numerical designations, with an "i" distinguishing those of this ninth example. Accordingly, there are the propeller blades 28i along with the hub 30i. There is also the speed changing power section 20i, the generator 22i, and auxiliary speed changing section 26i, an auxiliary drive section 24i, and a second auxiliary drive power 25i, which in this instance is in the form of a steam driven turbine.

This ninth example differs from the earlier examples in that the support structure (i.e., the nacelle 13i) has a nacelle substructure 141i to provide additional working areas for various purposes, such as to house heat recovery equipment associated with, for example, an auxiliary steam turbine drive.

The existing technology utilizes space in the wind turbine support tower and nacelle to house all equipment necessary to operate a wind turbine. At times it can be a challenge to install all equipment in the allowable space in a cost efficient manner and there is very little room for any extra equipment. Because the nacelle rotates to keep the wind turbine blades facing the wind, any equipment located in the support tower which must cooperate with equipment in the nacelle must address the problem of rotation. This means the design must incorporate flexible joints, cables, hoses and other interconnections that allow the necessary rotation. By installing a nacelle substructure below the nacelle and on the downwind side of the support tower, it is possible to provide a large amount of space to mount equipment which rotates with the nacelle. Thus, the problem of interfacing equipment that does not rotate with equipment that does rotate is eliminated.

Another advantage of nacelle substructures is that it can be shop fabricated and lifted by crane to attach to the underside of the nacelle. Because the nacelle substructure is designed with a width that is no wider than the support tower, there are no detrimental effects to efficient air flow across the tower which would have a negative impact on the wind turbine output. To the contrary, the shape of the nacelle substructure enclosure will act like a tail behind the tower to assist in yaw control.

This ninth example can be advantageous to any of the options described in earlier examples, including a standard wind turbine without any of these options. The substructure could be used with a standard wind turbine to house the electrical gear or other equipment located in the tower to achieve a cost savings during manufacturing. Due to the extremely tall support towers, it is possible to design the height of the substructure such that it extends down the tower as required to house all equipment intended to be located in the tower.

Although an auxiliary engine drive 24i and steam turbine drive 25i are shown coupled to the auxiliary gear 26i, various other configurations shown in other options are equally suited to cooperate with the nacelle substructure. For example, in FIG. 11, there is shown in the upper part of the substructure a heat recovery steam generator or organic rankine cycle heat recovery equipment, generally designated 260i. Then below this there are air cooled condensers indicated at 262i. Below the nacelle substructure 141i there is a support structure 272i which provides support for the substructure, and which could also provide support for at least part of the nacelle 13i itself. This support structure 272i comprises a pair of circumferential rings 274i which are connected to the tower 11i, and there are roller bearings 268i which are rotatably mounted for circular movement on the rings 274i around the tower 11i. Then the support structure 272i of the substructure, such as indicated at 278i, is supported by these bearing rings.

The nacelle substructure has the same width as the tower. Thus, the substructure can be extended further down the tower to accommodate additional equipment. There are various options which include the following: i) an engine only configuration in the nacelle; ii) /HRSG/Steam Turbine/Air Cooled Condenser; iii) engine/orc heat recovery/ajr cooled condenser; iv) solar steam generator/steam turbine/air cooled condenser; v) engine/HRSG/solar steam generator/steam turbine/ajr cooled condenser; vi) solar thermal heat absorber (heat transfer fluid)/orc heat recovery/air cooled condenser; vii) engine/solar thermal heat absorber (heat transfer fluid)/orc heat recovery/air cooler.

The nacelle substructure 141i is attached to the underside of the nacelle such that it rotates with the nacelle. Various pieces of equipment 260i can be located within the substructure on various levels. Examples are heat recovery equipment 260i, air cooled condensers 262i and cooling fans 264i. As indicated above, the structural supports 272i for the nacelle substructure are supported by the tower using metal support rings 274i enable the nacelle with roll around the support rings 274i when the nacelle rotates to face the wind. Solar thermal absorbers 280i are located on the support tower itself.

Obviously, the vertical dimension of the nacelle substructure could vary substantially. In the representation of the sub-nacelle in FIG. 1, its depth dimension (indicated at "b" in FIG. 11), is about 40% of the horizontal length dimension (indicated at "a" in FIG. 11), extending from the forward working end of the nacelle to the rear working end. Obviously, this vertical dimension "b" could be increased or decreased substantially, depending upon various factors. For example, this 40% dimension could be decreased down to about 30%, 20%, 15%, or 10%, or even as low as about 5%. Also, it could be greatly increased to values of, for example, 50%, 75%, 100%, 150%, 200%, 250%, 300%, 400%, 500%, or even possibly higher.

The nacelle substructure is an elegantly simple method of providing large amounts of space for equipment which rotates along with the nacelle and thereby eliminating the problem of interfacing rotating and non-rotating equipment. The additional weight will also be a counterweight to the wind turbine blades and will allow them to be located further from the tower, thus, reducing the blade flex when the blades pass by the tower.

To summarize at least some of the features of the present invention, the examples of the present invention provide the following advantages: i) the auxiliary drive system will allow a wind turbine to generate firm power rather than non-firm energy; ii) the hybrid wind turbine which incorporates the solar thermal heat recovery system into the wind turbine allows the same generator, switchgear, support tower, real estate, and transmission lines to be used by both the wind turbine and solar thermal power generator; iii) the nacelle sub-structure provides additional space to install equipment that must move with the equipment in the nacelle such as heat recovery steam generators, air coolers, organic rankine cycle heat recovery systems and electrical gear; iv) the nacelle sub-structure enclosure will act as a tail fin on the wind turbine to assist with yaw control; v) the nacelle sub-structure module can be constructed in a shop with ideal working conditions thus improving worker productivity and reducing construction costs; vi) the equipment located in the nacelle sub-structure can be installed in an upright position and remain in an upright position throughout the construction process (equipment located in the support tower must be turned on its side at some point during the shop fabrication, shipment, or construction process); vii) the energy conversion efficiency in BTU/KWH of the hybrid wind turbine which uses wind, and/or solar and/or thermal energy inputs in one combined system is very efficient when compared with the heat rate in BTU/KWH of a thermal energy conversion system alone due to the non-thermal energy inputs from the wind and solar systems; viii) all components of the hybrid wind turbine can be procured and constructed using commercially available equipment and commercially available engineering and construction practices; and ix) the nacelle sub-structure provides an alternate escape route for operations personnel in the event of a fire in the nacelle.

N. Tenth Example

Figure 12:
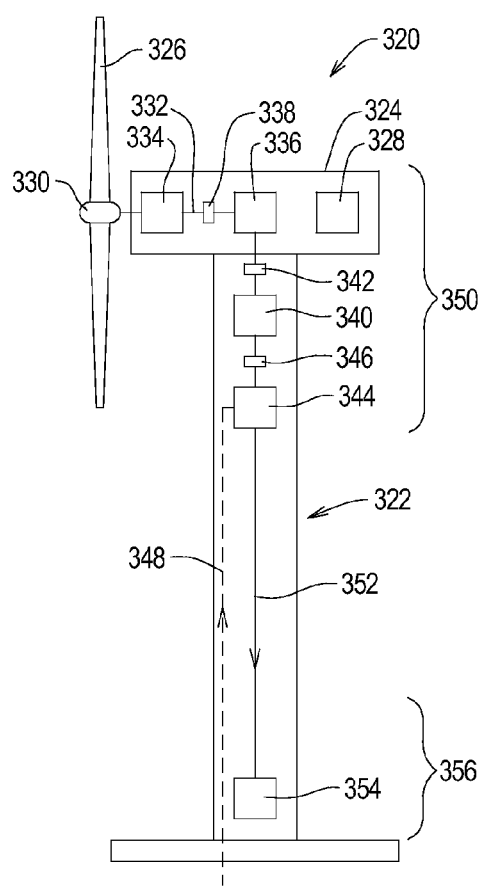
FIG. 12 is a somewhat schematic, elevation view of a hybrid wind turbine system of a tenth example of the present invention.

Referring now to FIG. 12, depicted therein is yet another example of a hybrid wind turbine system 320 of the present invention. The example hybrid wind turbine system 320 comprises a tower structure 322 capable of supporting the system 320 in a desired orientation. The tower structure 322 in turn supports a nacelle 324 and blades 326. As is conventional, the example nacelle 324 is mounted on the tower structure 322 such that the nacelle 324 may rotate to optimize the orientation of the blades 326 with respect to the wind at any point in time. FIG. 12 further shows that electrical switch gear 328 may be mounted within the nacelle 324.

The blades 326 are mounted on a hub 330 that is rotatably supported by the nacelle 324. In particular, the hub 330 may be conventionally supported by a generator shaft 332 of a generator 334. Accordingly, air movement rotates the blades 326 to cause the generator 334 to generate electricity.

In the example system 320, the generator shaft 332 is in turn connected to a gearbox 336 through a first overrunning clutch 338. The gearbox 336 is connected to a variable speed drive 340 through a second overrunning clutch 342. The variable speed drive 340 is connected to an auxiliary drive engine 344 through a coupling 346. The auxiliary drive engine 344 is connected to a fuel line 348 connected to a conventional fuel source (not shown) such as fuel storage tanks or utility fuel lines. The fuel line 348 depicted in FIG. 12 represents both a conduit for carrying fuel and the fuel carried by the conduit.

Accordingly, when desired, the auxiliary drive engine 344 may be operated to rotate the generator shaft 332 through the coupling 346, variable speed drive 340, second overrunning clutch 342, gearbox 336, and first overrunning clutch 338. Operation of the auxiliary drive engine 344 thus causes the generator 334 to generate electricity.

As with others of the example systems described above, the auxiliary drive engine 344 of the example system 320 is located in the top portion 350 of the system 320. In the example system 320, the top portion 350 containing the auxiliary drive engine 344 is located below the nacelle 324 within an upper end of the tower structure 322.

An exhaust line 352 connects the auxiliary drive engine 344 to a heat recovery system 354 located at a lower portion 356 of the system 320. Again, the exhaust line 352 depicted in FIG. 12 represents both engine exhaust and the conduit for carrying that exhaust. The example heat recovery system 354 is depicted within a lower end of the tower structure 322, but this system 354 may be located at least partly outside of the tower structure 322. The heat recovery system 354 may be implemented using any suitable system for reclaiming or generating energy from heat.

The example configuration depicted in FIG. 12 thus allows the auxiliary drive engine 344 to be mounted in a nonmovable section of the wind turbine system 320, in this case the tower structure 322. Mounting the auxiliary drive engine 344 within a nonmovable portion of the wind turbine system 320 allows exhaust from the engine 344 to be ducted down the tower structure 322 to heat recovery equipment located in the tower, or at the base of the tower, rather than to a substructure attached to the rotating nacelle 324.

O. Eleventh Example

Figure 13:
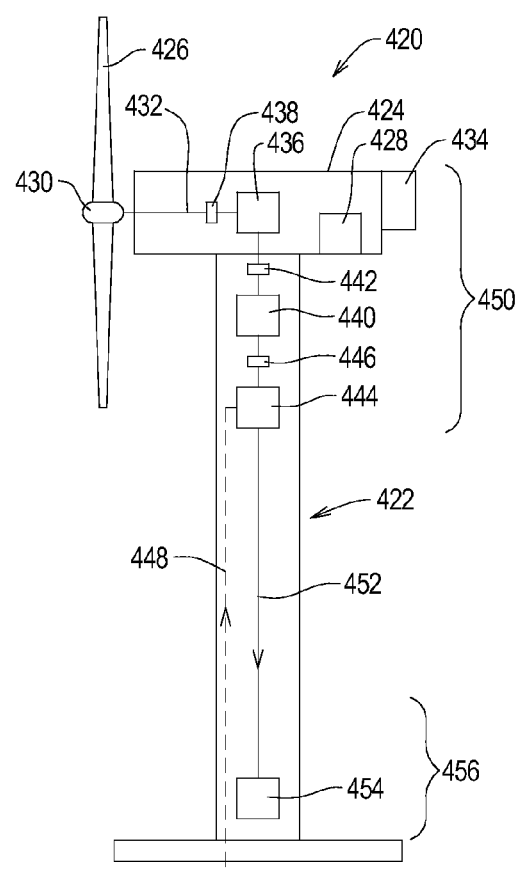
FIG. 13 is a somewhat schematic, elevation view of a hybrid wind turbine system of an eleventh example of the present invention.

Referring now to FIG. 13, depicted therein is yet another example of a hybrid wind turbine system 420 of the present invention. The example hybrid wind turbine system 420 comprises a tower structure 422 capable of supporting the system 420 in a desired orientation. The tower structure 422 in turn supports a nacelle 424 and blades 426. As is conventional, the example nacelle 424 is mounted on the tower structure 422 such that the nacelle 424 may rotate to optimize the orientation of the blades 426 with respect to the wind at any point in time. FIG. 13 further shows that electrical switch gear 428 may be mounted within the nacelle 424.

The blades 426 are mounted on a hub 430 that is rotatably supported by the nacelle 424. In particular, the hub 430 may be conventionally supported by a generator shaft 432 of a generator 434. Accordingly, air movement rotates the blades 426 to cause the generator 434 to generate electricity.

In the example system 420, the generator shaft 432 is in turn connected to a gearbox 436. In this example system 420, the blades 426 are located on an opposite end of the nacelle 424 from the generator 434, and the gearbox 436 is arranged between the blades 426 and the generator 434. An overrunning clutch 438 may be connected between the hub 430 and the gear box 436.

The gearbox 436 is connected to a fluid drive reduction gear 440 through an overrunning clutch 442. The fluid drive reduction gear 440 is connected to an auxiliary drive engine 444 through a coupling 446. The auxiliary drive engine 444 is connected to a fuel line 448 connected to a conventional fuel source (not shown) such as fuel storage tanks or utility fuel lines. The fuel line 448 depicted in FIG. 13 represents both a conduit for carrying fuel and the fuel carried by the conduit.

Accordingly, when desired, the auxiliary drive engine 444 may be operated to rotate the generator shaft 432 through the coupling 446, fluid drive reduction gear 440, overrunning clutch 442, and gearbox 436. Operation of the auxiliary drive engine 444 thus causes the generator 434 to generate electricity.

As with others of the example systems described above, the auxiliary drive engine 444 of the example system 420 is located in the top portion 450 of the system 420. In the example system 420, the top portion 450 containing the auxiliary drive engine 444 is located below the nacelle 424 within an upper end of the tower structure 422.

An exhaust line 452 connects the auxiliary drive engine 444 to a heat recovery system 454 located at a lower portion 456 of the system 420. Again, the exhaust line 452 depicted in FIG. 13 represents both engine exhaust and the conduit for carrying that exhaust. The example heat recovery system 454 is depicted within a lower end of the tower structure 422, but this system 454 may be located at least partly outside of the tower structure 422. The heat recovery system 454 may be implemented using any suitable system for reclaiming or generating energy from heat.

FIG. 13 thus illustrates another embodiment of a hybrid wind turbine of the present invention in which the auxiliary drive engine located in the top portion of the wind turbine tower below the nacelle. In this example, the generator 434 is a slow speed multi-pole generator. As with the example discussed in connection with FIG. 12, the auxiliary drive engine 444 is located in the non-movable section of the wind turbine, which allows the engine exhaust 452 to be ducted down through the tower structure 422 to heat recovery equipment 454 located in the tower structure 422, or at the base of the tower structure 422, rather than to a substructure which is attached to or located within the rotating nacelle 424.

Accordingly, in the example system shown in FIG. 13, the wind imparts energy to the wind turbine blades 426 which cause rotation of the blades 426 and the hub 430. The blade hub 430 is connected to the generator shaft 432; axial rotation of the generator shaft 432 turns the generator 434. The example generator 434 is a multi-pole type generator, such as a permanent magnet generator, and operates at the rotor speed of the wind turbine blades 426. In this configuration, a speed reduction gear is not required to allow the generator 434 to be connected to the shaft 432 connected to the hub 430. The generator can operate at various rotational speeds and produces alternating current which may or may not be at a standard frequency of 50 or 60 cycles per second. To correct for any frequency offset from a desired frequency, the output of the generator is converted to direct current and subsequently rectified back to 50 or 60 cycle AC current. By allowing the generator to operate at various speeds, turbine manufacturers are able to optimize the wind turbine efficiency for various wind speeds.

In FIG. 13, the coupling 446 and fluid drive reduction gear 440 reduce the rotational speed of the output shaft of the auxiliary drive engine 444. Additionally, the example engine 444 and the fluid drive reduction gear 440 are fixed in the axial center of the tower and do not rotate with the nacelle 424. The clutch 442 connects the fluid drive reduction gear 440 to the gearbox 436; the example gearbox 436 is a 90 degree speed reduction gearbox. The example gearbox 436 thus reduces the rotational speed of the output shaft of the engine 444 to a speed appropriate for driving the generator 434. The clutch 442 located between the gearbox 436 and the fluid drive reduction gear 440 allows the engine 444 to be disconnected from the gearbox 436 when the engine 444 is not in use. The engine 444 can operate simultaneously with the wind turbine to provide firm power output or it can operate independently if the wind turbine is idle (e.g., too little wind).

Although not shown in FIG. 13, the components that connect the fluid drive reduction gear 440 to the gearbox 436 may be a drive shaft with universal joints or an angle drive gear assembly. An angle drive gear assembly attached to gearbox 436 is capable of compensating for the small horizontal offset angle of equipment located in the nacelle 424. Conventionally, the angular relationship between the wind turbine equipment mounted in the nacelle and the wind turbine tower is not perpendicular. When the blades are driven by wind, this non-perpendicular relationship allows the blades to maintain a greater distance from the tower when they pass by the tower during operation, which reduces the flexing of the blades and, thus, reduces the probability of blade fatigue failure.

P. Twelfth Example

Figure 14:
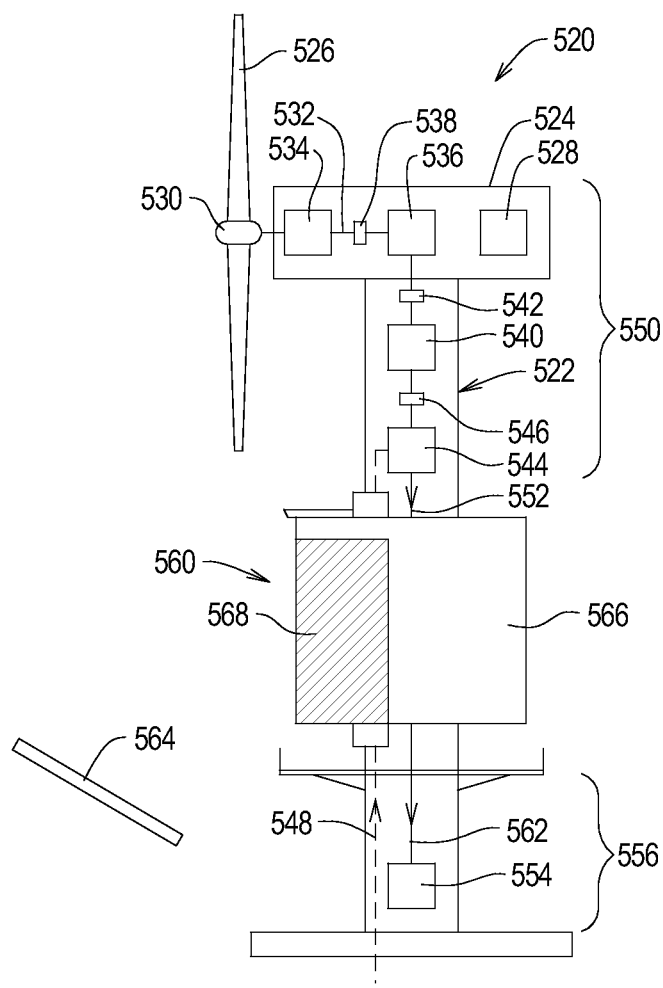
FIG. 14 is an elevation view of a hybrid wind turbine system of a twelfth example of the present invention.

Referring now to FIGS. 14-17, depicted therein is a twelfth example hybrid wind turbine system 520 of the present invention. The example hybrid wind turbine system 520 comprises a tower structure 522 capable of supporting the system 520 in a desired orientation. The tower structure 522 in turn supports a nacelle 524 and blades 526. As is conventional, the example nacelle 524 is mounted on the tower structure 522 such that the nacelle 524 may rotate to optimize the orientation of the blades 526 with respect to the wind at any point in time. FIG. 14 further shows that electrical switch gear 528 may be mounted within the nacelle 524.

The blades 526 are mounted on a hub 530 that is rotatably supported by the nacelle 524. In particular, the hub 530 may be conventionally supported by a generator shaft 532 of a generator 534. Accordingly, air movement rotates the blades 526 to cause the generator 534 to generate electricity.

In the example system 520, the generator shaft 532 is in turn connected to a gearbox 536 through a first overrunning clutch 538. The gearbox 536 is connected to a variable speed drive 540 through a second overrunning clutch 542. The variable speed drive 540 is connected to an auxiliary drive engine 544 through a coupling 546. The auxiliary drive engine 544 is connected to a fuel line 548 connected to a conventional fuel source (not shown) such as fuel storage tanks or utility fuel lines. The fuel line 548 depicted in FIG. 14 represents both a conduit for carrying fuel and the fuel carried by the conduit.

Accordingly, when desired, the auxiliary drive engine 544 may be operated to rotate the generator shaft 532 through the coupling 546, variable speed drive 540, second overrunning clutch 542, gearbox 536, and first overrunning clutch 538. Operation of the auxiliary drive engine 544 thus causes the generator 534 to generate electricity.

As with others of the example systems described above, the auxiliary drive engine 544 of the example system 520 is located in the top portion 550 of the system 520. In the example system 520, the top portion 550 containing the auxiliary drive engine 544 is located below the nacelle 524 within an upper end of the tower structure 522.

An exhaust line 552 connects the auxiliary drive engine 544 to a heat recovery system 554 located at a lower portion 556 of the system 520. Again, the exhaust line 552 depicted in FIG. 14 represents both engine exhaust and the conduit for carrying that exhaust. The example heat recovery system 554 is depicted within a lower end of the tower structure 522, but this system 554 may be located at least partly outside of the tower structure 522. The heat recovery system 554 may be implemented using any suitable system for reclaiming or generating energy from heat.

The example configuration depicted in FIG. 14 thus allows the auxiliary drive engine 544 to be mounted in a nonmovable section of the wind turbine system 520, in this case the tower structure 522. Mounting the auxiliary drive engine 544 within a nonmovable portion of the wind turbine system 520 allows exhaust from the engine 544 to be ducted down the tower structure 522 to heat recovery equipment located in the tower, or at the base of the tower, rather than to a substructure attached to the rotating nacelle 524.

As will be explained in further detail below, the example wind turbine system 520 further comprises a solar absorber system 560. The solar absorber system 560 is secured at a desired elevation relative to the tower structure 522; a solar heat line 562 carries heated fluid from the solar absorber system 560 to the heat recovery system 554 as will be described in further detail below.

The drawings further illustrate an absorber housing 566 and a layer of heat absorption material 568 on or forming a part of the housing 566. The heat absorption material 568 has desirable heat transfer properties and typically will be, or be coated with, a color, such as black, that facilitates the absorption of heat.

Figure 15:
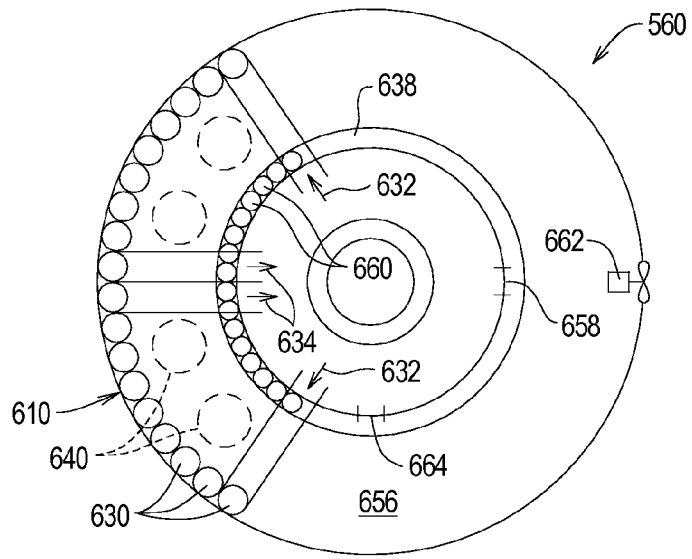
FIG. 15 is a section view of an absorber portion of the hybrid wind turbine system of FIG. 14.
Figure 16:
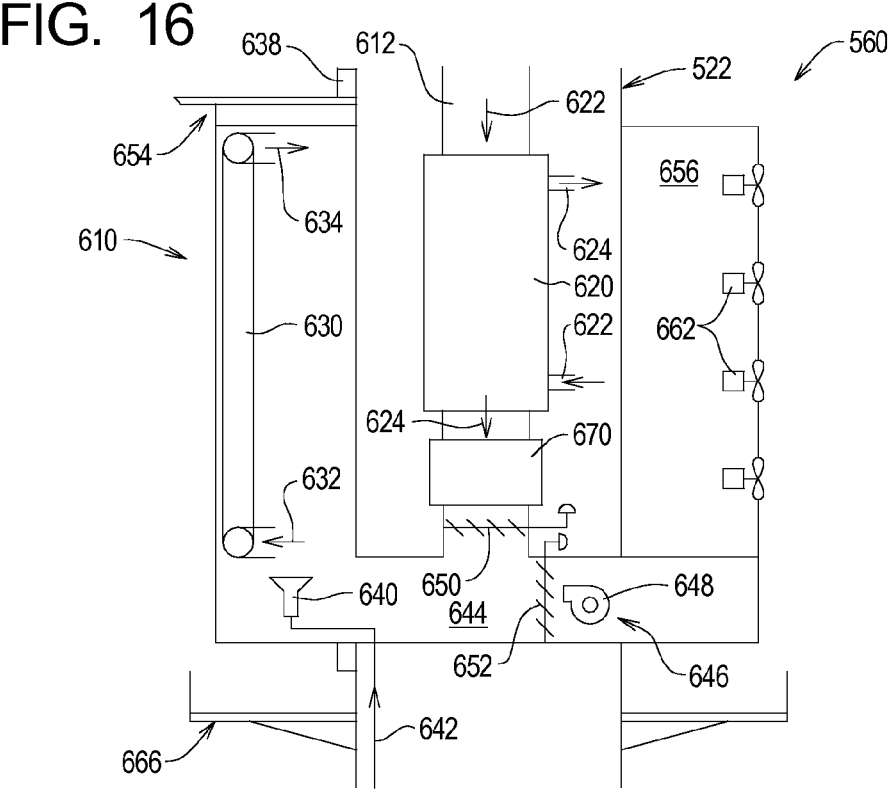
FIG. 16 is a longitudinal section view of the absorber portion of the hybrid wind of FIG. 14.

FIG. 14 shows the heat recovery system 554 and the solar absorber system 560 can be configured to recover both solar heat and heat generated by the auxiliary drive engine 544. FIGS. 14-16 only show the components of solar absorber system 560 on one side of the wind turbine tower for illustrative purposes. A wind turbine system incorporating a solar absorber system may have a first section facing east and a second section facing west to optimize absorption of solar energy during morning and afternoon. Additionally, one or more heliostats 564 may be arranged to direct solar rays onto the solar absorber system 560.

As is conventional, wind imparts energy to the wind turbine blades 526 which move the blades 526 and blade hub 530. The blade hub is connected to a shaft 532 which turns the generator 534. The example generator 534 used in this embodiment is preferably, but not necessarily, capable of operating at a very low speed to obviate the need for a speed reduction gear to allow the generator to be connected to the generator shaft 532. The example generator 534 is an AC permanent magnet generator that can operate at various rotational speeds and produces alternating current which may or not be at a standard frequency of 50 or 60 cycles per second. To correct for this possible deviation from the desired frequency, the output of the generator 534 is converted to direct current and subsequently rectified back to 50 or 60 cycle AC current. By allowing the generator 534 to operate at various speeds, wind turbine efficiency can be optimized for various wind speeds.

FIG. 14 illustrates that the auxiliary engine 544 is connected to the coupling 546, which is in turn connected to a fluid drive reduction gear 540 to reduce the speed of the drive shaft of the auxiliary drive engine 544. The example drive engine 544 and the fluid drive reduction gear 540 are fixed in the center of the tower and do not rotate with the nacelle. The coupling 542 connects the fluid drive reduction gear 540 to the speed reduction gearbox 536. The speed reduction gearbox 536 reduces the output shaft speed of the fluid drive reduction gear 540 to match the speed of the generator 534. The clutch 538 is located between the speed reduction gearbox 536 and the generator 534 to allow the generator 534 to be disconnected from the speed reduction gearbox 536 when the engine 544 is not in use. However, the engine 544 can operate simultaneously with the wind turbine to provide a firm power output, or the engine 544 can operate independently if the wind turbine is idle.

Referring now to FIGS. 15 and 16, a solar absorber 610 is mounted within the absorber housing 656. An example engine exhaust line 612 routes the engine exhaust to an engine exhaust heat exchanger 620 portion of the heat recovery system 660. The engine exhaust then flows through an emission control device 670 and an engine exhaust shutoff damper 650. Engine exhaust then flows from the engine exhaust shutoff damper 650 to an annular space 656 between solar absorber tubes 630 and tower wall insulation 638 to transfer more waste heat to the back side of the solar tubes 630.

A combustion air fan 648 draws ambient combustion air through an opening 646 in the tower structure 522 and sends it to the solar absorber burner 640. The burner 640 combusts gas or liquid fuel 642 with engine exhaust 612, combustion air, or a mixture of engine exhaust 612 and combustion air. The flue gas from the burner 640 flows upward in the annular space 656 between the absorber tubes 630 and tower wall insulation 638 and transfers heat to the absorber tubes 630. The combination of solar energy directed onto the outside of the solar absorber tubes 630, waste heat carried by the exhaust 612, and heat from combusting the supplemental fuel 642 directed to the inside of the solar absorber tubes 630 allows the solar absorber 610 to supply thermal energy continuously, if desired, during daytime or night time hours. This design feature allows the solar absorber 610 to be classified as a hybrid solar absorber.

FIG. 16 further illustrates a heat exchanger inlet 622, heat exchanger outlet 624, and burner combustion air duct 644. FIG. 15 illustrates optional cooling lines 660.

A heat transfer fluid is pumped through heat transfer fluid inlets 632 in the solar absorber tubes 630 to absorb heat from the solar and thermal energy sources. The hot heat transfer fluid flows out of outlets 634 in tubes 630 forming the solar absorber 610 to an organic rankine cycle heat recovery system turbine/generator or a conventional rankine cycle system turbine/generator to convert the thermal energy into electrical energy. Components of the Rankine cycle other than the solar absorption tubes 630, engine exhaust heat exchanger 620, emission control device 670, combustion air fan 648, associated dampers and controls, and burner 640 can be located, if desired, at ground level at the base of the tower structure 522 as described herein. Thermal insulation 638 is applied to the outside of the wind turbine tower structure 522 to prevent overheating due to a mis-directed solar reflector which normally directs the solar rays onto the solar absorber tubes 630.

A tower manway 658 allows access to the solar absorber access duct 656. The solar absorber access duct also allows access to the fin-fan air coolers 662 which are mounted on the wall of the solar absorber access duct 656. The fin-fan air coolers 662 reject waste heat from the rankine cycle heat transfer fluid to condense the fluid from the vapor state to the liquid state. The fin-fan coolers 662 can also be mounted on the ground at the base of the tower structure 522, if desired. The tower manway 658 also allows access to the solar absorber tubes 630. A tower manway 664 and platform 666 allow access to the burners 640 for maintenance.

Figure 17:
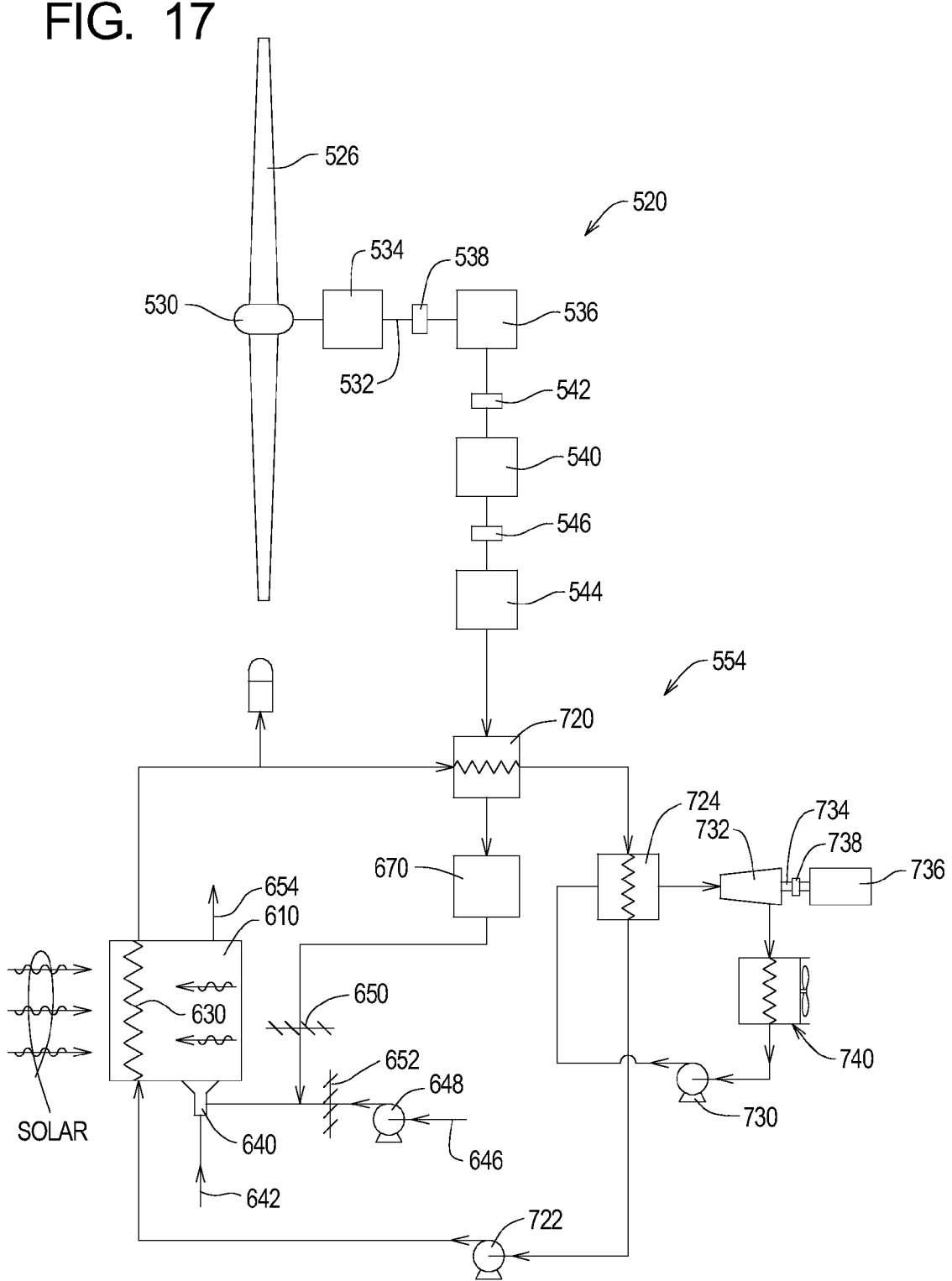
FIG. 17 is a schematic drawing of an example heat exchange system that may be used by the system of FIG. 14.

Referring now to FIG. 17, depicted therein is a process flow diagram illustrating an example energy recovery system that may be used with the heat recovery system of the example wind turbine systems of the present invention. For illustration purposes, the example energy recovery system shown in FIG. 17 is the heat recovery system 554 of the example wind turbine system 520 described above.

The example energy recovery system 554 depicted in FIG. 17 utilizes an organic rankine cycle heat recovery system. As generally discussed above, a hybrid wind turbine system incorporating this system 554 utilizes wind energy acting on blades 526 to turn a generator 534 to produce electricity, solar energy from the sun to produce electricity using an organic rankine cycle, and an engine 544 to generate supplemental or emergency power using conventional fossil fuels. The hot flue gas from the engine 544 flows through a heat exchanger 720 where it transfers heat to a circulating heat transfer fluid. The flue gas then passes through an emission control device 670 and then to the burner 640 before entering the solar absorber 610 where it passes by and transfers heat to the solar absorber tubes 630. Additional heat may be added to the engine 544 exhaust flue gas by utilizing the burner 640 to burn additional fuel. The flue gas contains sufficient oxygen to allow combustion of the supplemental fuel 642.

If the engine 544 is not operating, the solar absorber can still receive supplemental heat by operating the combustion air fan 648 to provide oxygen for combustion of the supplemental fuel 642. If the engine 544 is not operating and it is necessary to operate the combustion air fan, damper 650 is closed and damper 652 is opened to prevent combustion air from flowing through the ductwork backward toward the engine 544. If the engine 544 is running and it is not necessary or desired to operate the combustion air fan 648, the damper 652 will be in the closed position and damper 650 will be in the open position. After passing through the solar absorber 612, the exhaust flue gas 654 is vented to atmosphere.

A pump 722 is used to circulate the heat transfer fluid through the solar absorber and engine exhaust heat exchanger 720. The fluid then flows to the organic rankine cycle boiler 724 where it vaporizes the working fluid. The heat transfer fluid then flows back to the circulating pump 722 to be re-circulated through the system again.

A pump 730 is used to pump an organic rankine cycle working fluid such as isopentane to the boiler 724 where it is vaporized. The vapor then flows to the organic rankine cycle turbine 732 where it expands and turns a shaft 734 which is connected to a generator 736 using coupling 738. The vapor passes through the turbine 732 and flows to an air cooled condenser 740 which condenses the vapor into a liquid. The liquid flows back to the circulating pump 730 where it is pumped back to the boiler 724.

Figure 18:
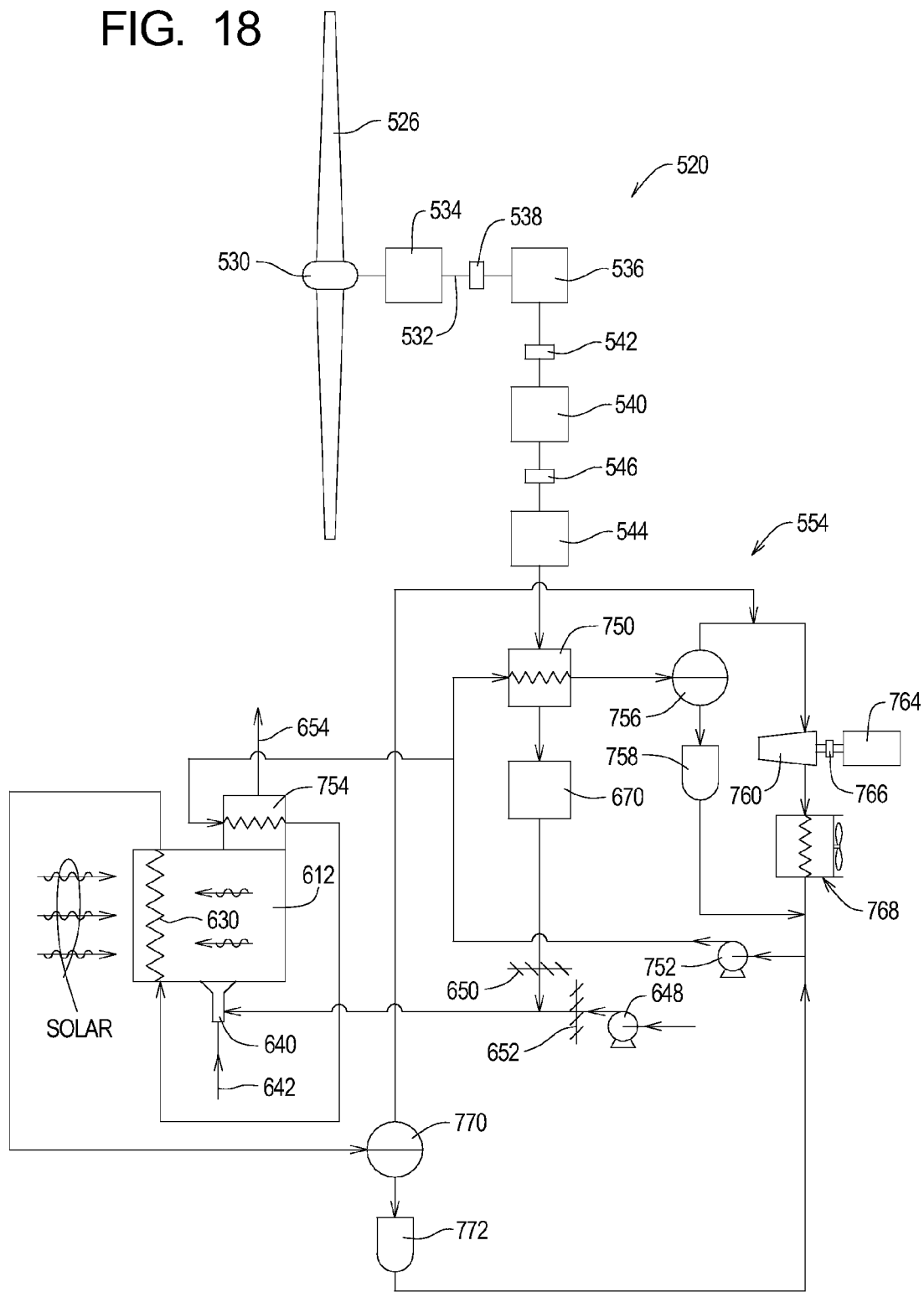
FIG. 18 is a schematic drawing of an example heat exchange system that may be used by the system of FIG. 14.

Referring now to FIG. 18, depicted therein is a process flow diagram illustrating an example energy recovery system that may be used with the heat energy recovery system of the example wind turbine systems of the present invention. For illustration purposes, the example energy recovery system shown in FIG. 18 is the heat recovery system 554 of the example wind turbine system 520 described above.

The heat recovery system 554 utilizes a steam rankine cycle heat recovery system. As generally discussed above, the system 520 utilizes the wind to turn the generator 534 to produce electricity, solar energy from the sun to produce electricity using an steam rankine cycle and an engine 544 to generate supplemental or emergency power using conventional fossil fuels. The hot flue gas from the engine 544 flows through a heat exchanger 750 where it transfers heat to a circulating heat transfer fluid. The flue gas then passes through an emission control device 670 and then to a burner 640 before entering the solar absorber 612 where it passes by and transfers heat to the solar absorber tubes 630.

Additional heat may be added to the engine 544 exhaust flue gas by utilizing the burner 640 to burn additional fuel 642. The flue gas contains sufficient oxygen to allow combustion of the supplemental fuel 642. If the engine 544 is not operating, the solar absorber 610 can still receive supplemental heat by operating the combustion air fan 648 to provide oxygen for combustion of the supplemental fuel 642. If the engine 544 is not operating and it is necessary to operate the combustion air fan, damper 650 is closed and damper 652 is opened to prevent combustion air from flowing through the ductwork backward toward the engine 544. If the engine 544 is running and it is not necessary or desired to operate the combustion air fan 648, the damper 650 will be in the open position and damper 652 will be in the closed position. After passing through the solar absorber 610, the exhaust flue gas 654 is vented to atmosphere.

The steam rankine cycle in FIG. 18 utilizes a feedwater pump 752 to pump feedwater to a convection section 754 of the solar absorber 610 and to the engine exhaust boiler 750. The feedwater that flows to the convection section 754 of the solar absorber 612 picks up heat from the engine exhaust flue gas 654 before this gas exits the convection section 754. The feedwater then flows through the solar absorber tubes 630 where it is converted into steam and then flows to a steam drum 770 for separation into steam and water. The steam flows out of the steam drum 770 to the steam turbine 760 where it turns the turbine rotor and drives the generator 764 through coupling 766 to generate electricity. Low pressure steam exits the steam turbine 760 and flows to a surface condenser 768 where it is condensed back to water and then flows to the feedwater pump 752 for recirculation. Water that is separated out in the steam drum 770 flows to a de-aerator 772 and back to the boiler feedwater pump 752.

Feedwater that is pumped to the engine exhaust boiler 750 is converted into steam and then flows to a steam drum 756 for separation into steam and water. The steam flows out of the steam drum 756 to the steam turbine 760 where it turns the turbine rotor and drives the generator 764 through coupling 766 to generate electricity. Low pressure steam exits the steam turbine 760 and flows to a surface condenser 768 where it is condensed back to water and then flows to the feedwater pump 752 for recirculation. Water that is separated out in the steam drum 756 flows to a deaerator 758 and back to the boiler feedwater pump 752.

While the present invention is illustrated by description of several examples and while the illustrative examples are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Q. Thirteenth Example

Figure 19:
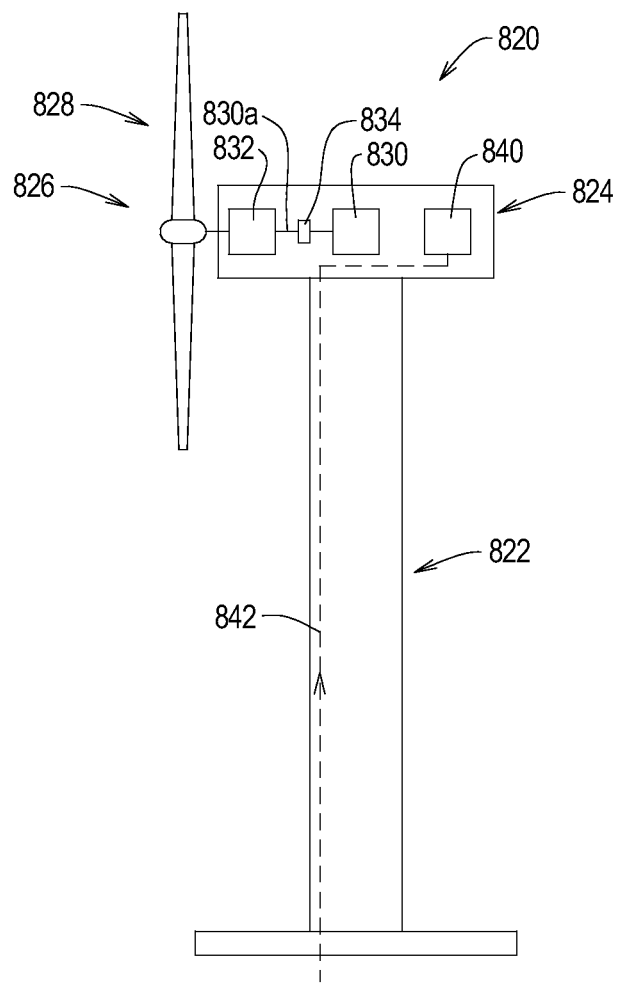
FIG. 19 is a an elevation view of an example hybrid wind turbine system that employs a fuel cell system as an auxiliary power source.

Referring now to FIG. 19, depicted therein is a thirteenth example hybrid wind turbine system 820 constructed in accordance with, and embodying, the principles of the present invention. The example hybrid wind turbine system 820 comprises a tower structure 822 on which is supported a nacelle structure 824. The nacelle structure 824 in turn supports a wind turbine 826 comprising a blade system 828 and a generator 830. The nacelle structure 824 rotates relative to the tower structure 822 to optimize orientation of a blade system 828 relative to the wind. The example blade system 828 is connected to a shaft 830*a* and a generator 830 through an optional gear system 832 and a coupling 834. As is conventional, wind causes rotation of the blade system 828, and rotation of the blade system 828 is transmitted to the generator shaft 830*a* such that the generator 830 generates electricity.

In the example hybrid wind turbine system 820, a fuel cell system 840 is also mounted within the nacelle structure 824. A fuel line 842 extends through the tower structure 822 and into the nacelle structure 824 to supply fuel to the fuel cell system 840. The fuel cell system 840 acts as an auxiliary power source when the energy supplied by the generator 830 falls below a predetermined level.

The hybrid wind turbine system 820 is thus capable of operating in a first mode in which rotation of the blade system 828 causes the generator 830 to generate electrical power, in a second mode in which the fuel cell system 840 generates electrical power, or in a third mode in which both the generator 830 and the fuel cell system 840 generate electrical power.

The example hybrid wind turbine system 820 allows the operator to determine the best source for the generation of electrical energy from either a wind turbine system or a fuel cell system depending on the costs and availability of wind and/or fuel at any given point in time.

R. Fourteenth Example

Figure 20:
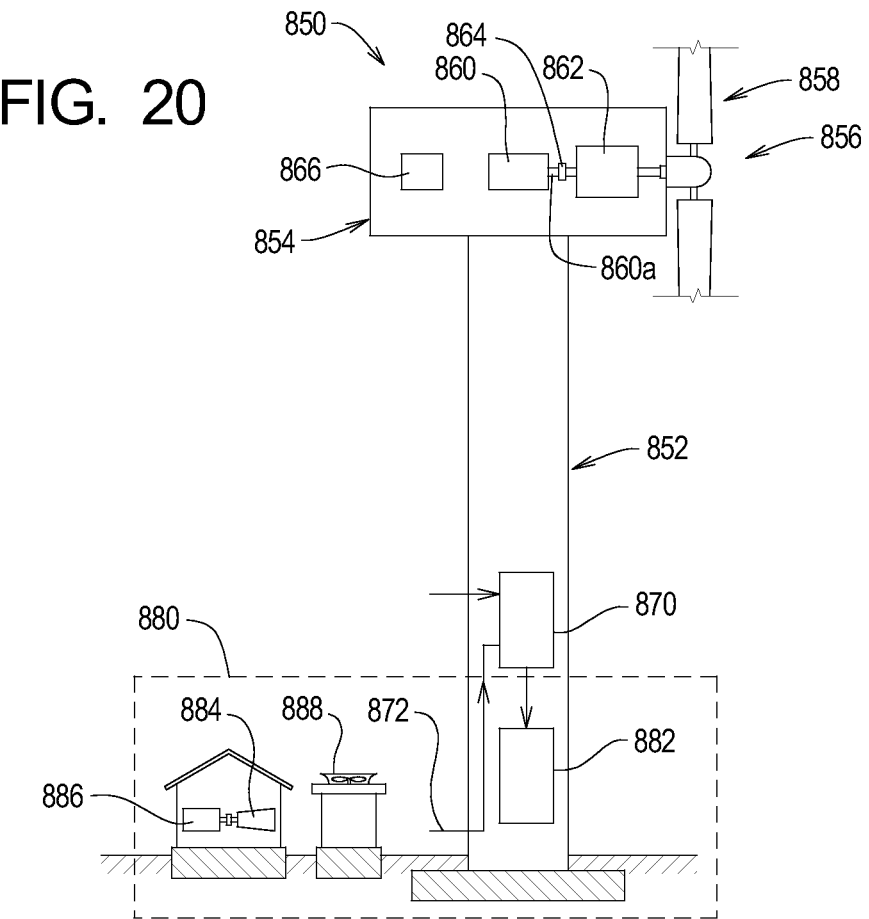
FIG. 20 is a an elevation view of an example hybrid wind turbine system that employs a tower mounted fuel cell as an auxiliary power source.
Figure 20A:
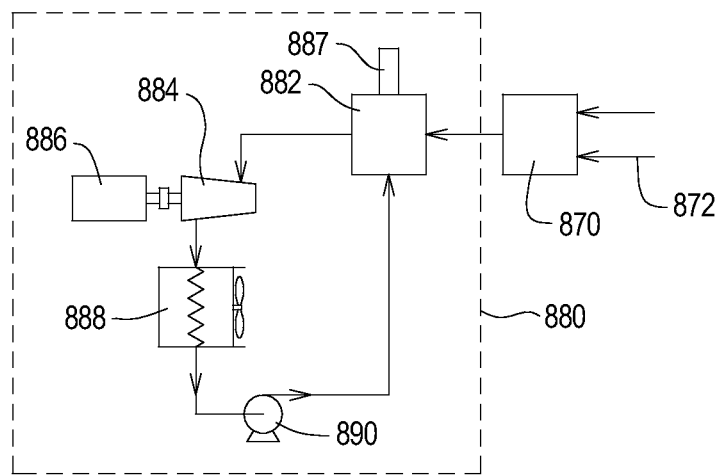
FIG. 20A is a process flow diagram of the example hybrid wind turbine system as depicted in FIG. 20.

Referring now to FIGS. 20 and 20A, depicted therein is a fourteenth example hybrid wind turbine system 850 constructed in accordance with, and embodying, the principles of the present invention. The example hybrid wind turbine system 850 comprises a tower structure 852 on which is supported a nacelle structure 854. The nacelle structure 854 in turn supports a wind turbine 856 comprising a blade system 858 and a generator 860. The nacelle structure 854 rotates relative to the tower structure 852 to optimize orientation of a blade system 858 relative to the wind. The example blade system 858 is connected to a shaft 860*a* of the generator 860 through an optional gear system 862 and a coupling 864. Optionally, switch gear 866 may also be located in the nacelle structure 854. As is conventional, wind causes rotation of the blade system 858, and rotation of the blade system 858 is transmitted to the generator shaft 860*a* such that the generator 860 generates electricity.

In the example hybrid wind turbine system 850, a fuel cell system 870 is also mounted within the tower structure 852. A fuel line 872 extends through the tower structure 852 to supply fuel to the fuel cell system 870. The fuel cell system 870 acts as an auxiliary power source when the energy supplied by the generator 860 falls below a predetermined level.

In addition, the example hybrid wind turbine system 850 comprises a heat recovery system 880 comprising a boiler 882, a turbine 884, a generator 886, and a condenser 888. As perhaps best shown in FIG. 20A, the example heat recovery system 880 comprises a pump 890 that causes working fluid to circulate through the boiler 882, the turbine 884, and the condenser 888.

Exhaust heat from the fuel cell 870 located in the support tower 852 is ducted to a boiler 882 to generate steam before being discharged to atmosphere through boiler stack 887 shown in FIG. 20A. The steam flows out of the boiler 882 to the steam turbine 884 where it turns the turbine rotor and drives the generator 886 to generate electricity. Low pressure steam exits the steam turbine 884 and flows to a surface condenser 888 where it is condensed back to water and then flows to the feedwater pump 890 for recirculation. The heat recovery system described in this section utilizes a steam rankine cycle although an organic rankine cycle could also be used for heat recovery.

The hybrid wind turbine system 850 is thus capable of operating in a first mode in which rotation of the blade system 858 causes the generator 860 to generate electrical power, in a second mode in which the fuel cell system 870 and/or the generator 886 generate electrical power, or in a third mode in which the generator 860, the fuel cell system 870, and the generator 886 generate electrical power.

The example hybrid wind turbine system 850 allows the operator to determine the best source for the generation of electrical energy at any given point in time and also to optimize the use of all sources of energy used by the system 850 by using waste heat created as a byproduct of one power generation system to produce power in a secondary power generation system.

In addition, it should be noted that the fourteenth embodiment depicted in FIG. 20 may be separated into three independent power generation systems. In particular, the power generation system formed by the fuel cell 870 and rankine power system 880 may be implemented as a stand-alone power generation system without the wind turbine system 856. Also, the fuel cell system 870 can be operated independent of the rankine system 880 and the rankine system 880 can be operated independent from the fuel cell system 870 if a separate fuel source is supplied to the boiler 882. In any event, the stand-alone power generation system formed by the rankine system 880 and fuel cell system 870 can generate power even without wind or a wind turbine system. This flexibility allows the production of firm electrical power on a continuous basis, if desired.

S. Fifteenth Example

Figure 21A:
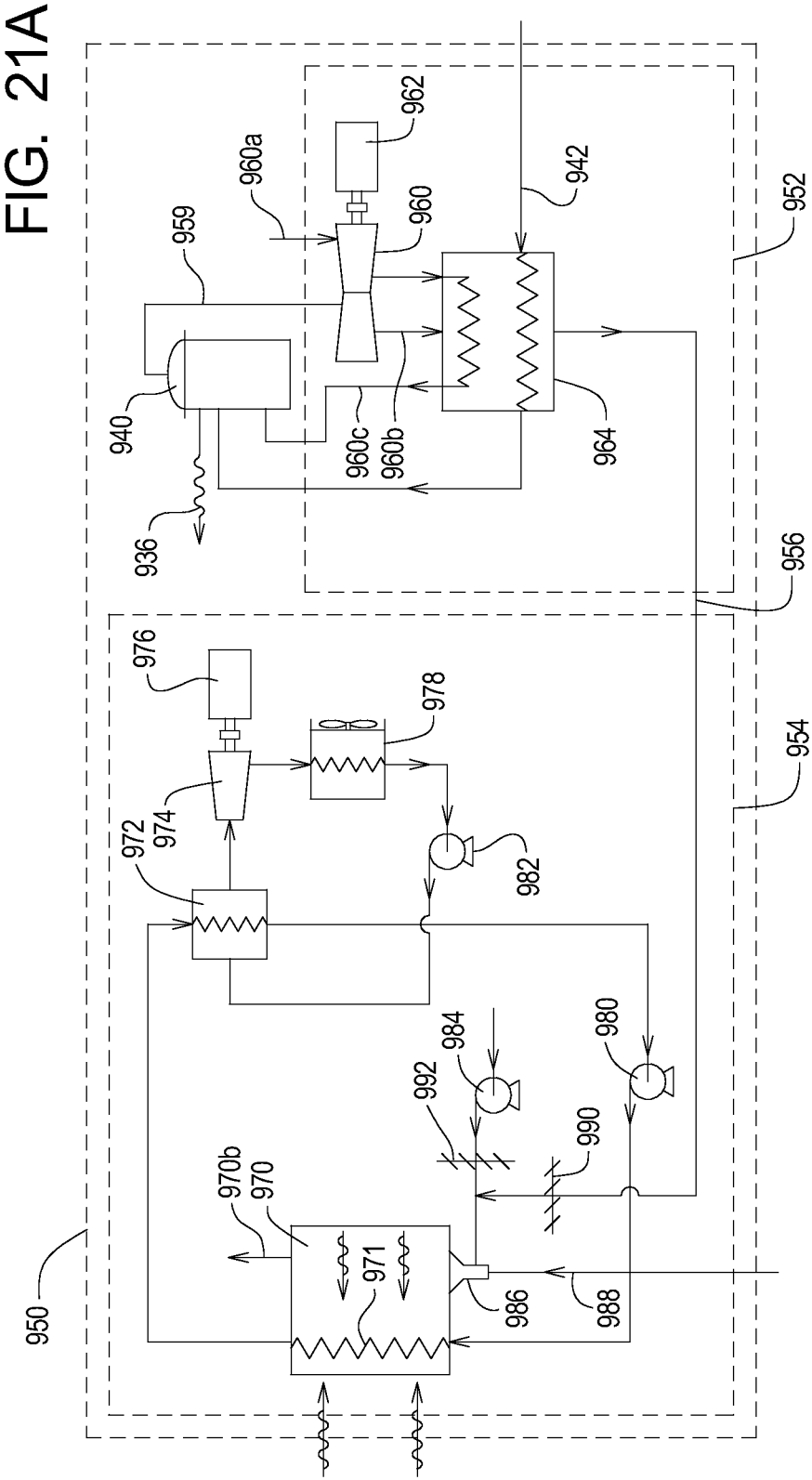
FIG. 21A is a process flow diagram of the example hybrid wind turbine system as depicted in FIG. 21.

Referring now to FIGS. 21 and 21A, depicted therein is a fifteenth example hybrid wind turbine system 920 constructed in accordance with, and embodying, the principles of the present invention. The example hybrid wind turbine system 920 comprises a tower structure 922 on which is supported a nacelle structure 924. The nacelle structure 924 in turn supports a wind turbine 926 comprising a blade system 928 and a generator 930. The nacelle structure 924 rotates relative to the tower structure 922 to optimize orientation of a blade system 928 relative to the wind. The example blade system 928 is connected to a shaft 930a of the generator 930 through an optional gear system 932 and a coupling 934. As is conventional, wind causes rotation of the blade system 928, and rotation of the blade system 928 is transmitted to the generator shaft 930a such that the generator 930 generates electricity.

In the example hybrid wind turbine system 920, a fuel cell system 940 is also mounted within the tower structure 922. A fuel line 942 extends through the tower structure 922 to supply fuel to the fuel cell system 940. The fuel cell system 940 acts as an auxiliary power source when the energy supplied by the generator 930 falls below a predetermined level. The example fuel cell system 940 is a solid oxide fuel cell.

In addition, the example hybrid wind turbine system 920 comprises a heat recovery system 950 comprising a hybrid fuel cell system 952 and a rankine cycle heat recovery system 954 as shown in FIG. 21A. A coupling conduit 956 allows fuel cell exhaust to flow from the hybrid fuel cell system 952 to the solar absorber and rankine cycle heat recovery system 954 as will be described in further detail below.

The hybrid fuel cell system 952 shown in FIG. 21A comprises a gas turbine 960, a generator 962, and a recuperator 964. The example solar absorber and rankine cycle heat recovery system 954 comprises a solar absorber 970, a boiler 972, a turbine 974, a generator 976, and a surface condenser 978.

As shown in FIG. 21, in the example hybrid wind turbine system 920 the fuel cell system 940, the gas turbine 960, the recuperator 964, the rankine cycle turbine 974, and the boiler 972 are mounted within the tower structure 922 and the solar absorber 970 is mounted on the outside of the tower structure 922. Additional components may be mounted on or within the tower structure, and components mounted within the tower structure in the example hybrid wind turbine system 920 may be mounted at locations outside of the tower structure such as on the ground or in the nacelle structure 924 as appropriate.

Referring now to FIG. 21A, in the hybrid fuel cell section 952 of the hybrid wind turbine 920, ambient air 960a is compressed in the gas turbine 960 compressor section and flows to a recuperator 964 to absorb heat from the hot gas turbine 960 exhaust stream 960b. Pressurized fuel 942 also flows through the recuperator 964 to absorb heat and pre-heat the fuel stream. The pre-heated pressurized fuel 942 flows to the fuel cell 940 where it reacts with pre-heated compressed air 960c to produce electrical power 936. The pressurized fuel cell exhaust gas 959 then flows to the gas turbine 960 expander section where it expands through the turbine and drives the generator 962 to produce electrical power. The gas turbine 960 exhaust gas 960b then flows to the recuperator 964 where it gives up heat to air 960a and fuel 942 streams before flowing to the solar absorber 970 through damper 990 and burner 986. The waste heat in the gas turbine exhaust stream 960b is further absorbed in the solar absorber tubes 971 before being routed to atmosphere through the solar absorber 970 exhaust duct 970b.

Solar radiation is directed toward the solar absorber 970 using mirrors at grade level surrounding the wind turbine support tower 922. Solar radiation, in combination with the hybrid fuel cell exhaust, transfer heat to the heat transfer medium flowing inside the solar absorber tubes 971. The heat transfer medium can be water or any commercially available heat transfer fluid. A feed pump 980 pumps the heat transfer fluid to the solar absorber tubes 971 where it absorbs heat and flows to a boiler 972 where it transfers its heat in the boiler 972 to generate steam. The steam flows to a turbine 974 where it turns the turbine rotor and drives the generator 976 to generate electricity. Low pressure steam exits the steam turbine 974 and flows to a surface condenser 978 where it is condensed back to water and then flows to the feedwater pump 982 for recirculation. The heat recovery system described in this section utilizes a steam rankine cycle although an organic rankine cycle could also be used for heat recovery.

Additional heat can be added to the solar absorber to produce additional power on cloudy days or at night by combusting supplemental fuel 988 in burner 986. If necessary, additional combustion air can be supplied to burner 986 using fan 984 and damper 992.

In this example of the invention power is produced in the wind turbine section, the hybrid fuel cell section, and the solar absorber section of the hybrid wind turbine to produce a firm power output, if desired.

The hybrid wind turbine system 920 is thus capable of operating in a first mode in which rotation of the blade system 928 causes the generator 930 to generate electrical power, in a second mode in which the fuel cell system 940 and/or the generators 962 and/or 976 generate electrical power, or in a third mode in which the generator 930, the fuel cell system 940, and/or the generators 962 and/or 976 generate electrical power.

The example hybrid wind turbine system 920 allows the operator to determine the best source for the generation of electrical energy at any given point in time and also to optimize the use of all sources of energy used by the system 920.

The fifteenth embodiment depicted in FIG. 21A may be separated into three independent power generation systems. In particular, the power generation system formed by the solar and hybrid fuel cell systems may be implemented as stand-alone power generation systems without the wind turbine system. In any event, the stand-alone power generation systems formed by the solar and fuel cell systems can generate power independently and without wind or a wind turbine system.

T. Sixteenth Example

Figure 22:
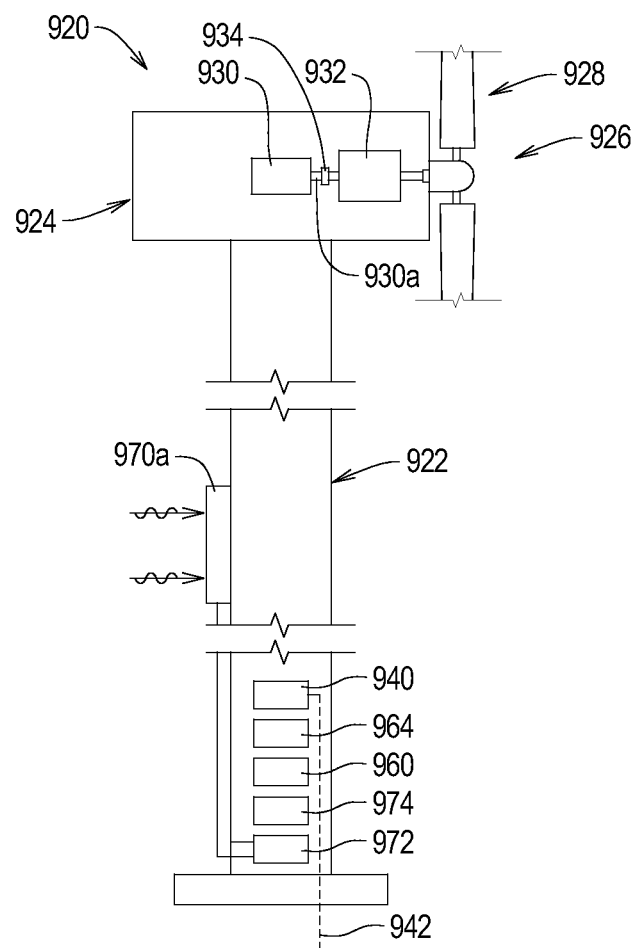
FIG. 22 is an elevation view of an example hybrid wind turbine system that employs a tower mounted hybrid fuel cell as an auxiliary power source and also including a tower mounted solar absorber system, in which air is used as a heat transfer medium.
Figure 22A:
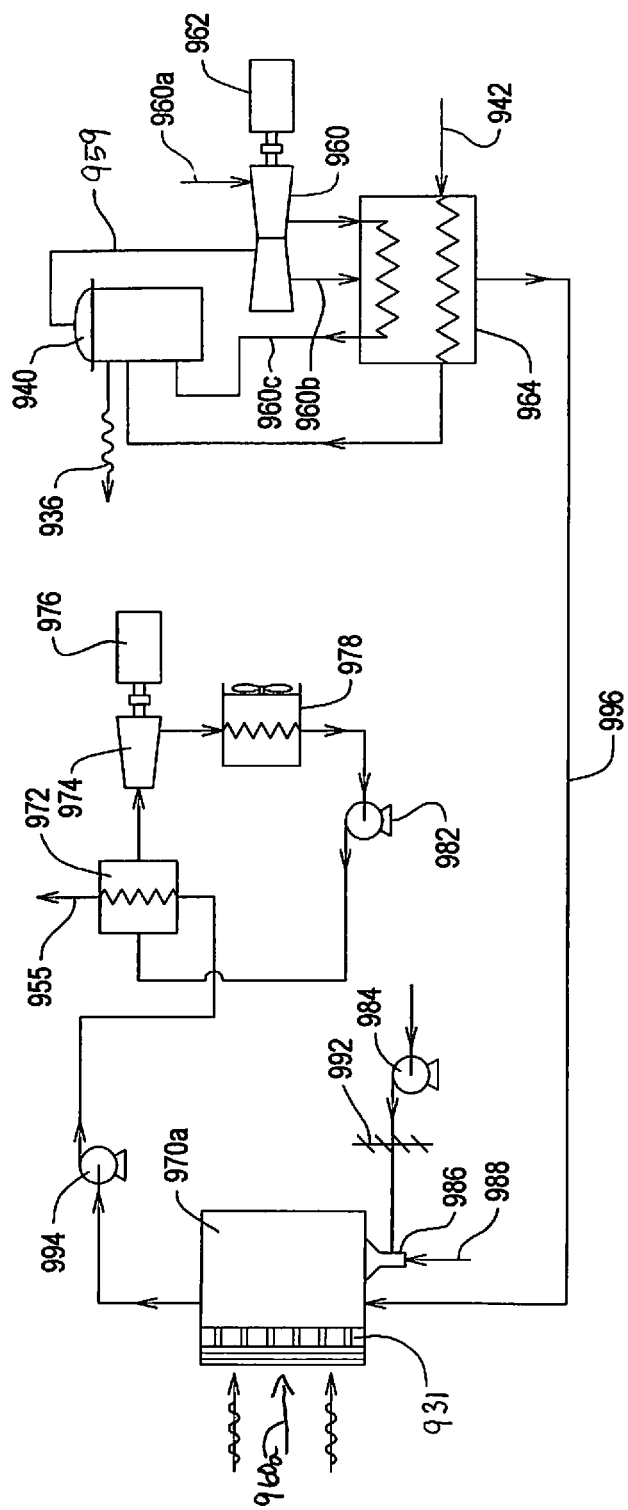
FIG. 22A is a process flow diagram of the example hybrid wind turbine system as depicted in FIG. 22.

Referring now to FIGS. 22 and 22A, depicted therein is a sixteenth example hybrid wind turbine system 920 constructed in accordance with, and embodying, the principles of the present invention. The example hybrid wind turbine system 920 comprises a tower structure 922 on which is supported a nacelle structure 924. The nacelle structure 924 in turn supports a wind turbine 926 comprising a blade system 928 and a generator 930. The nacelle structure 924 rotates relative to the tower structure 922 to optimize orientation of a blade system 928 relative to the wind. The example blade system 928 is connected to a shaft 930*a* of the generator 930 through an optional gear system 932 and a coupling 934. As is conventional, wind causes rotation of the blade system 928, and rotation of the blade system 928 is transmitted to the generator shaft 930*a* such that the generator 930 generates electricity.

In the example hybrid wind turbine system 920, a fuel cell system 940 is also mounted within the tower structure 922. A fuel line 942 extends through the tower structure 922 to supply fuel to the fuel cell system 940. The fuel cell system 940 acts as an auxiliary power source when the energy supplied by the generator 930 falls below a predetermined level. The example fuel cell system 940 is a solid oxide fuel cell.

The example hybrid wind turbine system 920 shown in FIG. 22 includes the same components as the wind turbine system shown in FIG. 21 including the fuel cell 940, recuperator 964, gas turbine 960, boiler 972, and steam turbine 974. However, the solar absorber 970*a* in FIG. 22 uses ambient air as the heat transfer medium whereas the solar absorber 970 in FIG. 21 uses a liquid heat transfer medium which is contained within pipes 971.

Referring now to FIG. 22A, in the hybrid fuel cell section of the hybrid wind turbine 920, ambient air 960*a* is compressed in the gas turbine 960 compressor and flows to a recuperator 964 to absorb heat from the hot gas turbine 960 expander section exhaust stream 960*b*. Pressurized fuel 942 also flows through the recuperator 964 to absorb heat and pre-heat the fuel stream. The pre-heated pressurized fuel 942 flows to the fuel cell 940 where it reacts with pre-heated compressed air 960*c* to produce electrical power 936. The pressurized fuel cell exhaust gas 959 then flows to the gas turbine 960 expander section where it expands through the turbine and drives the generator 962 through to produce electrical power. The gas turbine 960 expander exhaust gas 960*b* then flows to the recuperator where it gives up heat to air 960*a* and fuel 942 streams before flowing to the solar absorber 970*a*. The waste heat in the gas turbine 960 expander exhaust stream 960*b* contributes additional thermal energy to the air flowing through the solar absorber 970*a*.

Solar radiation is directed toward the solar absorber 970*a* using mirrors at grade level surrounding the wind turbine support tower 922. Solar radiation directed onto ceramic or metallic solar fill 931 heats the solar fill 931 to very high temperatures. Ambient air 960*a* is heated to very high temperatures as it is pulled through the heated solar fill 931 and into the solar receiver 970*a* by induced draft fan 994. The hot air is then combined with the hot exhaust gas 996 from the recuperator 964 and flows to the boiler 972 to generate steam before being exhausted from the boiler 972 through its stack 955. The steam generated flows to a steam turbine 974 where it turns the turbine rotor and drives the generator 976 to generate electricity. Low pressure steam exits the steam turbine 974 and flows to a surface condenser 978 where it is condensed back to water and then flows to the feedwater pump 982 for recirculation. The heat recovery system described in this section utilizes a steam rankine cycle to absorb heat from the hot air stream flowing to the boiler 972 although an organic rankine cycle could also be used for heat recovery.

Additional heat can be added to the solar absorber to produce additional power on cloudy days or at night by combusting supplemental fuel 988 in burner 986. If necessary, additional combustion air can be supplied to burner 986 using fan 984 and damper 992.

The example hybrid wind turbine system 920 allows the operator to determine the best source for the generation of electrical energy at any given point in time and also to optimize the use of all sources of energy used by the system 920.

The fifteenth embodiment depicted in FIG. 22A may be separated into three independent power generation systems. In particular, the power generation system formed by the solar and hybrid fuel cell systems may be implemented as stand-alone power generation systems without the wind turbine system. In any event, the stand-alone power generation systems formed by the solar and fuel cell systems can generate power independently and without wind or a wind turbine system.

U. Seventeenth Example

Figure 23:
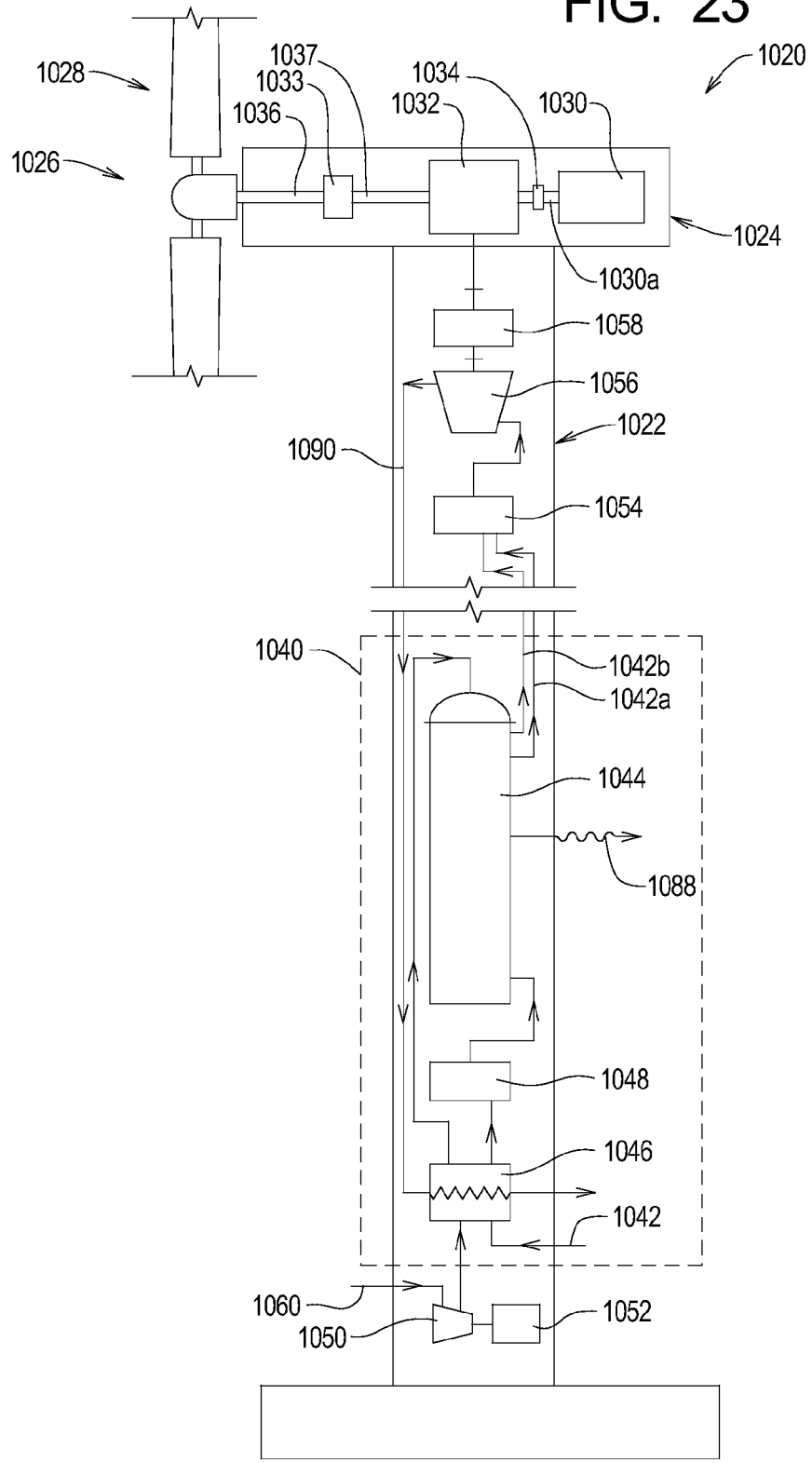
FIG. 23 is an elevation view of an example hybrid wind turbine that employs a hybrid fuel cell system as an auxiliary power source.
Figure 24:
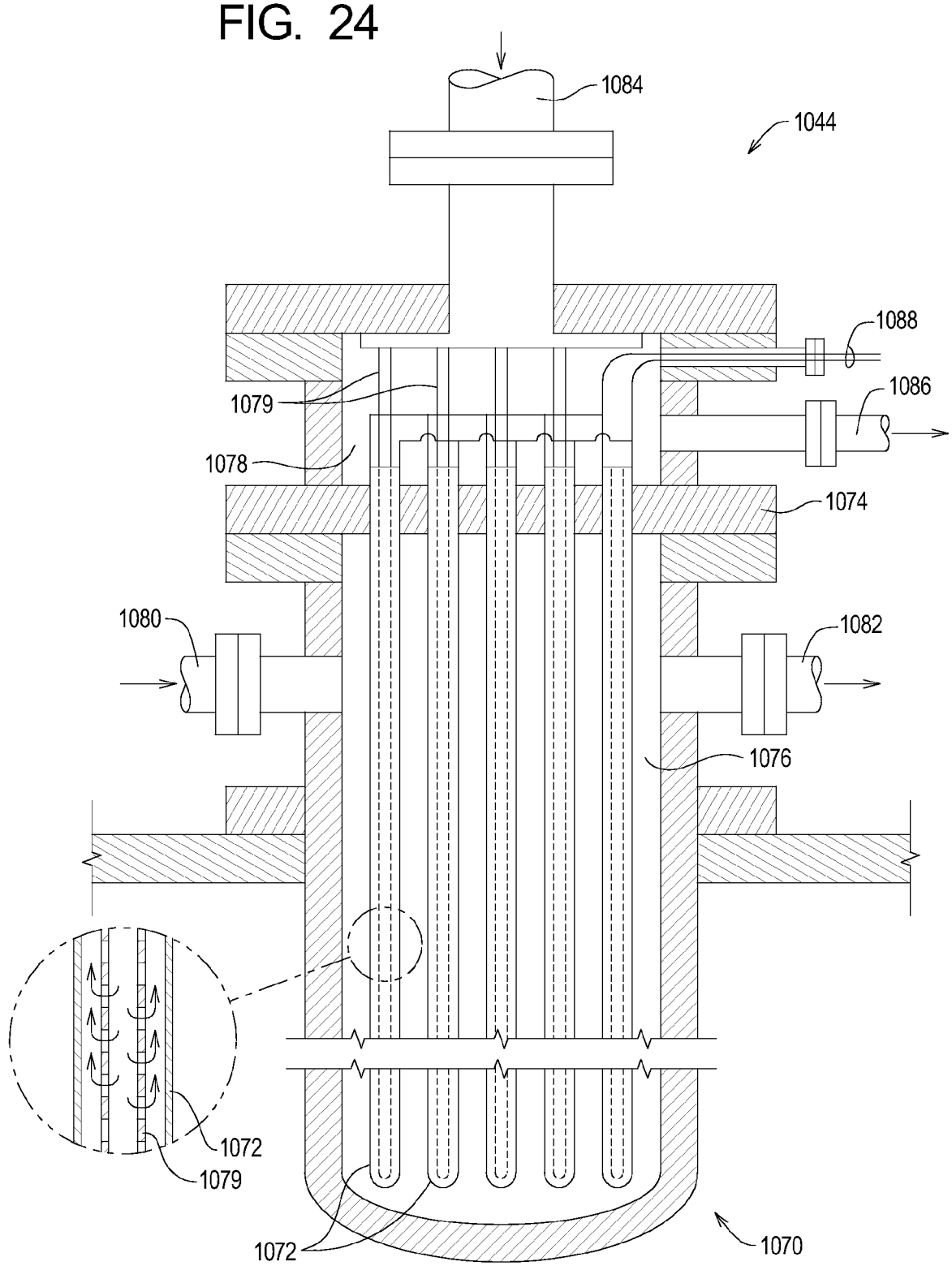
FIG. 24 is a section view illustrating an example fuel cell module that may be used by the hybrid wind turbine of FIG. 23.

Referring now to FIGS. 23 and 24, depicted therein is a seventeenth example hybrid wind turbine system 1020 constructed in accordance with, and embodying, the principles of the present invention. The example hybrid wind turbine system 1020 comprises a tower structure 1022 on which is supported a nacelle structure 1024. The nacelle structure 1024 in turn supports a wind turbine comprising a blade system 1028 and a generator 1030. The nacelle structure 1024 rotates relative to the tower structure 1022 to optimize orientation of a blade system 1028 relative to the wind. The example blade system 1028 is connected to a shaft 1030*a* of the generator 1030 through a gear system 1032 and a coupling 1034. As is conventional, wind causes rotation of the blade system 1028, and rotation of the blade system 1028 is transmitted to the generator shaft 1030*a* such that the generator 1030 generates electricity. FIG. 23 also shows an overrunning clutch 1033 which decouples the wind turbine shaft 1036 from the gear 1032 input shaft 1037 when it is desirable to operate the generator 1030 using the auxiliary power source without the wind turbine 1026. This could take place if there was no wind to operate the wind turbine section 1026.

In the example hybrid wind turbine system 1020, a hybrid fuel cell system 1040 is also mounted within the tower structure 1022. A fuel line 1042 extends through the tower structure 1022 to supply fuel to the fuel cell system 1040. The hybrid fuel cell system 1040 acts as an auxiliary power source when the energy supplied by the generator 1030 falls below a predetermined level.

More specifically, the example fuel cell system 1040 comprises fuel cell unit 1044. Fuel flowing through the fuel conduit 1042 passes through a recuperator 1046 and a fuel reformer 1048 before reaching the fuel cell unit 1044. The recuperator 1046 preheats the fuel entering the fuel cell unit 1044. The fuel cell unit 1044 converts the fuel into electricity 1088 leaving hydrogen rich exhaust that exits the fuel cell unit through an exhaust conduit 1042a.

In addition, the example hybrid wind turbine system 1020 comprises an air compressor 1050, a motor 1052, a post fuel cell combustor 1054, an expander 1056, and a reduction gear/torque converter 1058. The exhaust conduit 1042a is connected to the post fuel cell combustor 1054. Air is introduced into the compressor 1050 through an air inlet 1060. The motor 1052 operates the compressor 1050 to force pressurized air through the recuperator 1046, through the fuel cell unit 1044, and into the post fuel combustor 1054. The pressurized air flowing into the fuel cell unit 1044 increases efficiency of the fuel cell process and allows energy recovery in the gas expander 1056 downstream of the fuel cell unit 1044. The pressurized air flows through the fuel cell unit 1044 and is then routed through the spent air conduit 1042b to the post fuel cell combustor 1054 where it is mixed with the hydrogen rich exhaust flowing through exhaust conduit 1042a.

The post fuel combustor 1054 burns any hydrocarbons in the hydrogen rich exhaust that were not processed into electricity by the fuel cell unit 1044 and creates a working fluid that flows into the expander 1056. The expander 1056 is coupled to the reduction gear/torque converter 1058. The working fluid within the expander 1056 is converted into rotational movement that is transmitted through the reduction gear/torque converter 1058 to the gear system 1032. The gear system 1032 transfers this rotational movement to the generator 1030 such that the generator 1030 generates electricity. In the example system 1020, the exhaust from the expander 1056 is returned through a return conduit 1090 to the recuperator 1046 to extract any remaining heat within this exhaust.

Referring for a moment to FIG. 24, the example fuel cell unit 1044 is depicted therein in further detail. The example fuel cell unit 1044 comprises a pressure vessel assembly 1070 and one or more tubular fuel cells 1072. The pressure vessel assembly 1070 comprises a seal plate 1074 that defines a fuel chamber 1076 and an air chamber 1078. The pressure vessel assembly 1070 further defines a fuel inlet 1080 and an exhaust outlet 1082 in fluid communication with the fuel chamber 1076 and an air inlet 1084 and an air outlet 1086 in fluid communication with the air chamber 1078. The fuel cells 1072 extend through the seal plate 1074 to maintain a separation between the combustible fuel and air. The fuel cell power output electrical leads 1088 are attached to the fuel cells 1072 within the air chamber 1078.

In use, fuel enters the fuel chamber 1076 through the fuel inlet 1080 and reacts with the external side of the tubular fuel cells 1072 within the fuel chamber 1076 to generate electrical current that is present at the electrical leads 1088. Any unprocessed fuel within the fuel chamber 1076 will flow out of the fuel chamber 1076 through the exhaust outlet 1082. At the same time, air flows through the air inlet 1084 and down through the perforated air distribution rods 1079 which distribute air throughout the interior of the tubular fuel cells 1072. The oxygen in the air then reacts with the interior side of the fuel cells 1072 and with the hydrogen on the exterior side of the tubular fuel cells 1072 through the fuel cell wall to complete the flameless combustion process and produce electricity 1088. The oxygen depleted air then exits the air chamber 1078 through vessel nozzle 1086 and flows to the post combustion fuel processor 1054.

The hybrid wind turbine system 1020 is thus capable of operating in a first mode in which rotation of the blade system 1028 causes the generator 1030 to generate electrical power, in a second mode in which the fuel cell system 1040 and exhaust energy is used to augment operation of the generator 1030, or in a third mode in which the generator 1030 and the fuel cell system 1040 generate electrical power independently.

The example hybrid wind turbine system 1020 allows the operator to determine the best source for the generation of electrical energy at any given point in time and also to optimize the use of all sources of energy used by the system 1020 by using heat created as a byproduct of one power generation system in a secondary power generation system.

V. Eighteenth Example

Figure 25:
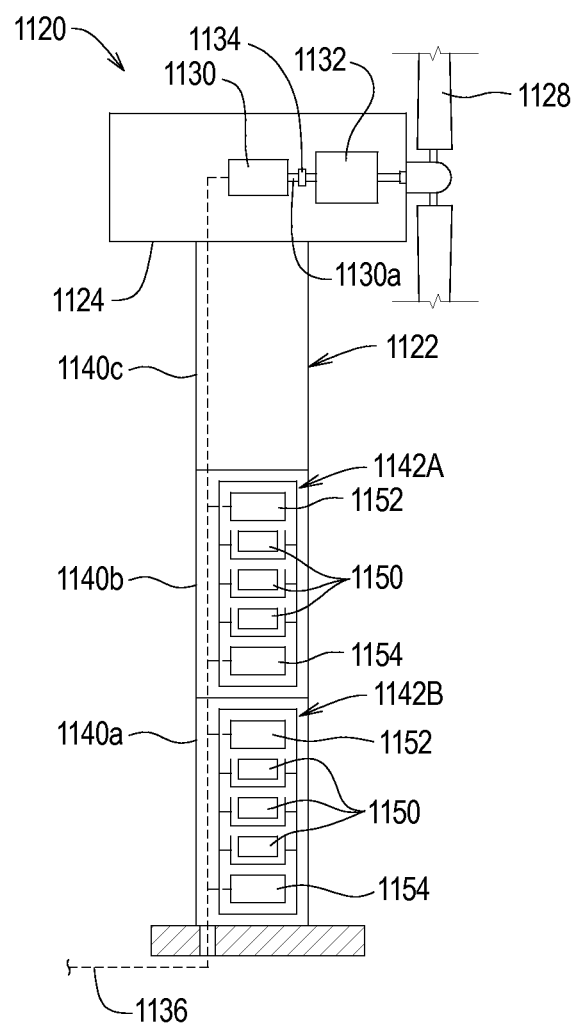
FIG. 25 is an elevation view of an example hybrid wind turbine system having a plurality of tower modules.

Referring now to FIG. 25, depicted therein is an eighteenth example hybrid wind turbine system 1120 constructed in accordance with, and embodying, the principles of the present invention. The example hybrid wind turbine system 1120 comprises a tower structure 1122 on which is supported a nacelle structure 1124. The nacelle structure 1124 in turn supports a wind turbine comprising a blade system 1128 and a generator 1130. The nacelle structure 1124 rotates relative to the tower structure 1122 to optimize orientation of a blade system 1128 relative to the wind. The example blade system 1128 is connected to a shaft 1130a of the generator 1130 through a gear system 1132 and a coupling 1134. As is conventional, wind causes rotation of the blade system 1128, and rotation of the blade system 1128 is transmitted to the generator shaft 1130a such that the generator 1130 generates a primary electrical output that may be used to power a load represented by a line 1136.

FIG. 25 further illustrates that tower structure 1122 of the example hybrid wind turbine system 1120 is formed of a plurality of tower modules 1140. In particular, the tower modules 1140 are modular, and three of the tower modules 1140a, 1140b, and 1140c are assembled on site to form the example tower structure 1122. The tower modules 1140 can be identical or can be fabricated in different lengths, and fewer or more than three tower modules 1140 may be provided depending upon a desired height of the tower structure 1122.

In the example hybrid wind power turbine system 1120, two of the three tower modules 1140 further comprise a battery system 1142. In particular, the first tower module 1140a comprises a first battery system 1142a, while the second tower module 1140b comprises a second battery system 1142b. Although three tower modules 1140 and two power modules 1142 are provided in the example wind turbine system 1120, battery systems 1142 may be provided for any number of the tower modules 1140 as determined by the requirements of a particular installation.

Each battery system 1142 comprises an array of batteries 1150, an AC/DC converter 1152, and a DC/AC converter 1154. The AC/DC converter 1152 is connected between the batteries 1150 and the generator 1130. The DC/AC converter 1154 is connected between the batteries 1150 and the load 1136. With appropriate switch control, the functions of the converters 1152 and 1154 can be implemented using the same power circuitry.

In a first mode, the generator 1130 supplies electricity directly to the load 1136. In a second mode, the generator 1130 supplies at least a portion of the electricity generated thereby to the AC/DC converter 1152 to charge the batteries 1150. In a third mode, the DC/AC converter 1154 generates a standby electrical power output that may be used to power the load 1136.

The system 1120 is typically operated in the first mode when the load 1136 is capable of consuming the power generated by the generator 1130. When the load 1136 is not capable of consuming the power generated by the generator 1130, the system 1120 is operated in the second mode to charge, and thus store power in, the battery system 1142. When generator 1130 is not capable of supplying enough power to supply the load 1136, the system 1120 operates in the third mode to supply power to the load 1136 using power stored in the battery system 1142. The system 1120 may operate in both the first and second modes to allow power from the battery system 1142 to augment the power generated by the generator 1130.

The battery system 1142 may be located in the tower structure 1122 and/or in the nacelle structure 1124. The battery system 1142 is typically a modular structure that may be shop assembled or field assembled in any size and form factor to fit or retrofit a particular existing or future tower structure 1122 and/or nacelle structure 1124. The tower structure 1122 and/or nacelle structure 1124 may designed to accommodate the batteries 1150; alternatively, the tower structure 1122 and/or nacelle structure 1124 may be retrofit to accommodate the batteries 1150. The batteries 1150 may be integrally formed with one or more sections of the tower structure 1122.

In the example hybrid wind turbine system 1120, each battery system 1142 is preassembled with one of the associated tower modules 1140. The example battery systems 1142 may thus be shipped with the tower modules 1140 and electrically connected as the tower modules 1140 are assembled to form the tower structure 1122.

To facilitate shipping of the battery systems 1142, within or separate from the tower modules 1140, the example battery systems 1142 comprise a frame assembly 1160, a plurality of tray portions 1162, and a pivot assembly 1164 that pivotably connects the tray portions 1162 to the frame portion 1160. Batteries such as the example batteries 1150 typically define an upright orientation and should be stored, shipped, and used in the upright orientation. The pivot assemblies 1164 support the batteries 1150 relative to the frame assembly 1160 such that the frame assembly 1160 may be rotated relative to horizontal during fabrication of the tower modules 1140 and assembly of these modules 1140 to form the tower structure 1122 while allowing the batteries 1150 to remain in the upright orientation.

A battery system such as the example battery system 1142 may be used in conjunction with any of the embodiments of the hybrid wind turbine systems of the present invention as described above.

What is claimed is:

1. An electrical power generation system comprising:
   a tower;
   a nacelle supported by the tower;
   a wind turbine system supported on the nacelle, where the wind turbine system generates electrical power from wind;
   a fuel line extending through at least a portion of the tower;
   a fuel cell system arranged at least partly within the tower and the nacelle, where the fuel cell system generates electrical power from fuel carried by the fuel line, and transfers waste heat to fuel cell exhaust gas;
   a solar absorber supported by the tower, where the solar absorber transfers solar heat to a solar absorber heat transfer fluid; and
   a heat recovery system, where the heat recovery system converts heat carried by at least one of the fuel cell exhaust gas and the solar absorber heat transfer fluid into electrical power.

2. An electrical power generation system as recited in claim 1, in which the fuel cell exhaust gas comprises fuel cell exhaust.

3. An electrical power generation system as recited in claim 2, in which the fuel cell exhaust flows through the solar absorber such that heat carried by the fuel cell exhaust is transferred to the solar absorber heat transfer fluid.

4. An electrical power generation system as recited in claim 1, in which the solar absorber heat transfer fluid flows through a boiler forming part of the heat recovery system.

5. An electrical power generation system as recited in claim 4, in which the heat recovery system is a rankine cycle heat recovery system.

6. An electrical power generation system as recited in claim 4, in which:
   the wind turbine system further comprises a wind turbine generator for generating electrical power; and
   electrical power generated by the heat recovery system causes the wind turbine generator to operate.

7. An electrical power generation system as recited in claim 1, further comprising a modular battery system.

8. A method generating electrical power comprising the steps of:
   providing a tower;
   supporting a nacelle on the tower;
   supporting a wind turbine system on the nacelle such that wind causes the wind turbine system to generate electrical power;
   supporting at least a portion of a fuel cell system within at least one of the tower and the nacelle;
   extending a fuel line extending through at least a portion of the tower;
   connecting the fuel line to the fuel cell system such that the fuel cell system generates electrical power from fuel carried by the fuel line, and transfers waste heat to fuel cell exhaust gas;
   supporting a solar absorber on the tower, where solar heat absorbed by the solar absorber is transferred to a solar absorber heat transfer fluid; and
   operating a heat recovery system to convert heat carried by at least one of the fuel cell exhaust gas and the solar absorber heat transfer fluid into electrical power.

9. A method as recited in claim 8, in which the fuel cell exhaust gas comprises fuel cell exhaust.

10. A method as recited in claim 8, further comprising the step of arranging the fuel cell system within the tower.

11. A method as recited in claim 8, further comprising the step of causing the solar absorber heat transfer fluid to flow through a boiler forming part of the heat recovery system.

12. A method as recited in claim 11, in which the heat recovery system is a rankine cycle heat recovery system.

13. A method as recited claim 11, in which:
   the wind turbine system further comprises a wind turbine generator for generating electrical power; and
   electrical power generated by at least one of the fuel cell and the heat recovery system causes the wind turbine generator to operate.

* * * * *